(12) United States Patent
Lee et al.

(10) Patent No.: US 11,589,212 B2
(45) Date of Patent: Feb. 21, 2023

(54) METHOD AND APPARATUS FOR MANAGING EVENT IN COMMUNICATION SYSTEM

(71) Applicant: Samsung Electronics Co., Ltd., Suwon-si (KR)

(72) Inventors: Hyewon Lee, Suwon-si (KR); Jonghan Park, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/525,214

(22) Filed: Nov. 12, 2021

(65) Prior Publication Data

US 2022/0070658 A1 Mar. 3, 2022

Related U.S. Application Data

(63) Continuation of application No. 16/767,407, filed as application No. PCT/KR2018/014716 on Nov. 27, 2018, now Pat. No. 11,178,535.

(30) Foreign Application Priority Data

Nov. 28, 2017 (KR) .......................... 10-2017-0161060

(51) Int. Cl.
*H04W 8/20* (2009.01)
*H04W 4/60* (2018.01)
(Continued)

(52) U.S. Cl.
CPC ............. *H04W 8/205* (2013.01); *H04W 4/60* (2018.02); *H04W 8/183* (2013.01); *H04W 12/06* (2013.01); *H04W 12/35* (2021.01)

(58) Field of Classification Search
CPC ....... H04W 8/205; H04W 4/60; H04W 12/35; H04W 8/183; H04W 12/06
See application file for complete search history.

(56) References Cited

U.S. PATENT DOCUMENTS

2012/0198512 A1 8/2012 Zhou et al.
2012/0260090 A1 10/2012 Hauck et al.
(Continued)

FOREIGN PATENT DOCUMENTS

CN 103404103 A 11/2013
CN 105282732 A 1/2016
(Continued)

OTHER PUBLICATIONS

International Search Report and Written Opinion dated Feb. 21, 2019, issued in International Application No. PCT/KR2018/014716.

(Continued)

*Primary Examiner* — Barry W Taylor
(74) *Attorney, Agent, or Firm* — Jefferson IP Law, LLP

(57) ABSTRACT

Disclosed is a terminal including a transceiver; and at least one processor, wherein the at least one processor transmits a first message which makes a request for an event to a subscription relay server, receives event-related information from the subscription relay server in response to the first message, transmits a second message which makes a request for an event to a profile provision server, based on the event-related information, and controls the transceiver to receive information related to event processing from the profile provision server in response to the second message.

16 Claims, 14 Drawing Sheets

(51) Int. Cl.
*H04W 8/18* (2009.01)
*H04W 12/06* (2021.01)
*H04W 12/30* (2021.01)

(56) References Cited

U.S. PATENT DOCUMENTS

| | | | |
|---|---|---|---|
| 2015/0237551 A1* | 8/2015 | Jin | H04W 8/183 |
| | | | 370/331 |
| 2016/0006728 A1 | 1/2016 | Park et al. | |
| 2016/0021529 A1 | 1/2016 | Park et al. | |
| 2016/0261395 A1 | 9/2016 | Agarwal et al. | |
| 2016/0283216 A1 | 9/2016 | Gao | |
| 2016/0373920 A1 | 12/2016 | Petersson et al. | |
| 2017/0064552 A1* | 3/2017 | Park | H04L 9/3273 |
| 2017/0289792 A1 | 10/2017 | Park | |
| 2017/0338944 A1 | 11/2017 | Yang et al. | |
| 2018/0041601 A1 | 2/2018 | Park et al. | |
| 2018/0070224 A1 | 3/2018 | Park et al. | |
| 2018/0131699 A1* | 5/2018 | Park | H04W 12/08 |
| 2019/0058989 A1 | 2/2019 | Park et al. | |
| 2019/0074983 A1 | 3/2019 | Yang et al. | |
| 2019/0104401 A1 | 4/2019 | Park et al. | |
| 2019/0230087 A1 | 7/2019 | Gharout et al. | |
| 2020/0120484 A1* | 4/2020 | Ullah | H04W 8/20 |
| 2020/0236546 A1 | 7/2020 | Yu et al. | |
| 2020/0272446 A1 | 8/2020 | Koo et al. | |
| 2020/0275256 A1 | 8/2020 | Salmela et al. | |
| 2021/0092589 A1* | 3/2021 | Alonso Alarcon | H04W 12/06 |

FOREIGN PATENT DOCUMENTS

| | | |
|---|---|---|
| CN | 105939335 A | 9/2016 |
| CN | 106664545 A | 5/2017 |
| EP | 2106071 A1 | 9/2009 |
| KR | 10-2016-0115832 A | 10/2016 |
| KR | 10-2017-0035242 A | 3/2017 |
| WO | 2015-190895 A1 | 12/2015 |
| WO | 2016/133369 A1 | 8/2016 |
| WO | 2017/052136 A1 | 3/2017 |
| WO | 2017/164500 A1 | 9/2017 |

OTHER PUBLICATIONS

Korean Office Action dated Sep. 23, 2021, issued in Korean Application No. 10-2017-0161060.

Chinese Office Action dated May 7, 2022, issued in a counterpart Chinese Application No. 201880076704.3.

B. Sarikaya; Independent Submission; DHCPV6 Prefix Delegation in Long Term Evolution Networks; Jul. 31, 2012.

T. Lemon; Internet Engineering Task Force (IETF); Custiomzing DHCP Configuration on the Basis of Network Topology; Oct. 31, 2016.

European Office Action dated Sep. 21, 2022, issued in a counterpart European Application No. 18 884 401 .3.

Chinese Office Action with English translation dated Jan. 11, 2023; Chinese Application No. 201880076704.3.

* cited by examiner

METHOD AND APPARATUS FOR MANAGING EVENT IN COMMUNICATION SYSTEM

CROSS-REFERENCE TO RELATED APPLICATIONS

This application is a continuation application of prior application Ser. No. 16/767,407, filed on May 27, 2020, which will be issued as U.S. Pat. No. 11,178,535 on Nov. 16, 2021, which is a U.S. National Stage application under 35 U.S.C. § 371 of an International application No. PCT/KR2018/014716, which was filed on Nov. 27, 2018, and claimed priority of a Korean patent application No. 10-2017-0161060, filed on Nov. 28, 2017, in the Korean Intellectual Property Office, the disclosure of which is incorporated by reference herein in its entirety.

TECHNICAL FIELD

The present disclosure relates to a method and an apparatus for managing an event.

The present disclosure relates to a method and an apparatus for establishing a communication connection by downloading and installing a communication service in a terminal in a communication system.

The present disclosure relates to a method and an apparatus for downloading, installing, and managing a profile online in a communication system.

BACKGROUND ART

In order to meet wireless data traffic demands, which have increased since the commercialization of 4G communication systems, efforts to develop improved 5G communication systems or pre-5G communication systems have been made. For this reason, a 5G communication system or pre-5G communication system is called a beyond-4G-network communication system or a post-LTE system. In order to achieve a high data transmission rate, implementation of the 5G communication system in an mmWave band (for example, 60 GHz band) is being considered. In the 5G communication system, technologies such as beamforming, massive MIMO, Full Dimensional MIMO (FD-MIMO), array antenna, analog beamforming, and large-scale antenna technologies are being discussed as means to mitigate a propagation path loss in the ultrahigh-frequency band and to increase the propagation transmission distance. Further, in the 5G communication system, technologies such as an evolved small cell, an advanced small cell, a cloud Radio Access Network (RAN), an ultra-dense network, Device-to-Device communication (D2D), a wireless backhaul, a moving network, cooperative communication, Coordinated Multi-Points (CoMP), and received interference cancellation have been developed to improve the system network. In addition, in the 5G system, Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non-Orthogonal Multiple Access (NOMA), and Sparse Code Multiple Access (SCMA) have been developed.

Meanwhile, the Internet has evolved from a human-oriented connection network, in which humans generate and consume information, to an Internet-of-Things (IoT) network in which distributed components such as objects exchange and process information. Internet-of-Everything (IoE) technology, in which big-data processing technology is combined with IoT technology through a connection with a cloud server or the like, has emerged. In order to implement IoT, technical factors such as sensing techniques, wired/wireless communication, network infrastructure, service-interface technology, and security technology are required, and research on technologies such as sensor networks, Machine-to-Machine (M2M) communication, Machine-Type Communication (MTC), and the like for connection between objects has recently been conducted. In an IoT environment, through the collection and analysis of data generated in connected objects, an intelligent Internet Technology (IT) service may be provided to create new value in peoples' lives. The IoT may be applied to fields such as smart homes, smart buildings, smart cities, smart cars, connected cars, smart grids, health care, smart home appliances, or high-tech medical services through the convergence of conventional Information Technology (IT) and various industries.

Accordingly, various attempts to apply the 5G communication system to the IoT network are being made. For example, technologies such as sensor networks, Machine to Machine (M2M), and Machine Type Communication (MTC) are implemented by beamforming, MIMO, and array antenna schemes. The application of a cloud RAN as big-data processing technology is an example of the convergence of 5G technology and IoT technology.

A Universal Integrated Circuit Card (UICC) is a smart card inserted into a mobile communication terminal. The UICC may include an access control module for accessing a network of a mobile communication service provider. For example, the access control module may include a Universal Subscriber Identity Module (USIM), a Subscriber Identity Module (SIM), and an IP Multimedia Service Identity Module (ISIM). The UICC including the USIM is generally called a USIM card. Similarly, the UICC including the SIM is generally called a SIM card.

The terms "SIM card", "UICC card", "USIM card", and UICC including ISIM" in the present disclosure may be interchangeably used in this specification. That is, the technology of a SIM card may be equally applied to a USIM card, an ISIM card, or a general UICC.

A SIM card stores private information of a mobile communication subscriber, and authenticates a subscriber and creates a traffic security key when the subscriber accesses a mobile communication network, thereby making it possible to stably use the mobile communication.

In an aspect of embodiments proposed in the present disclosure, the SIM card is generally manufactured as a card dedicated for a particular mobile communication service provider according to a request of the corresponding service provider while the SIM card is produced and is released with authentication information for network access of the corresponding service provider, for example, a Universal Subscriber Identity Module (USIM) application, an International Mobile Subscriber Identity (IMSI), a K value, and an Operator Constant (OPc) value, installed therein in advance. Accordingly, the corresponding mobile communication service provider receives the delivery of the manufactured SIM card in order to provide it to the subscriber, and thereafter performs management, such as installation, modification, deletion, and the like, of an application in the UICC using technologies such as Over-The-Air (OTA), etc. when necessary. The subscriber may insert the UICC into his/her own mobile communication terminal to use the network and application services of the corresponding mobile communication service provider, and when replacing the terminal, the subscriber may move and insert the UICC from the existing terminal to a new terminal to use the authentication information, the mobile communication phone numbers, the personal telephone number list, and the like, which are stored in the UICC, in the new terminal as they are.

However, SIM cards are inconvenient when the user of a mobile communication terminal receives a service from another mobile communication company. The user of the mobile communication terminal is inconvenienced when physically acquiring the SIM card in order to receive the service from a mobile communication service provider. For example, when traveling to other countries, the user must obtain a local SIM card in order to receive a local mobile communication service, which inconveniences the user. Roaming service resolves this inconvenience somewhat, but there are also problems of high fees and the lack of service if there is no contract between telecommunication companies.

Meanwhile, when the SIM is remotely download and installed in the UICC, the inconvenience can be resolved. That is, the user may download the SIM of the mobile communication service that the user desires to use to the UICC at a point in time that the user desires. The UICC may download and install a plurality of SIMs, select only one SIM therefrom, and use the selected SIM. The UICC may or may not be fixed to the terminal Particularly, the UICC, which is fixed to the terminal and used, is referred to as an embedded UICC (eUICC). In general, the eUICC is a UICC that may be fixed to the terminal to be used and that remotely downloads and selects a SIM. In the present disclosure, UICCs that can remotely download and select a SIM are collectively called eUICCs. That is, among UICCs that can remotely download and select a SIM, UICCs are collectively called eUICCs, regardless of whether or not they are fixed to the terminal. Further, downloaded SIM information is collectively called an eUICC profile.

DISCLOSURE OF INVENTION

Solution to Problem

Various embodiments Various embodiments of the present disclosure may provide a method and an apparatus by which a terminal selects a communication service and establishes a communication connection in a communication system.

Various embodiments of the present disclosure may provide a method and an apparatus by which a terminal downloads a profile for establishing a communication connection online and installs and manages the downloaded profile.

Various embodiments of the present disclosure may provide a method and an apparatus by which a terminal efficiently searches for and downloads a profile in a communication system.

Various embodiments of the present disclosure may provide a method by which a terminal provides a notification of the information about an event and information about the subscription relay server (SM-DS Info) that was most recently accessed when a terminal accesses a subscription relay server or a profile provision server.

Various embodiments of the present disclosure may provide a method by which a terminal manages an event-processing exception list for preventing unnecessary events from being processed.

Various embodiments of the present disclosure may provide a method by which a profile provision server provides a notification of an event expiration time point (Expiry Date) at which an event is automatically deleted when registering the corresponding event in a subscription relay server.

Various embodiments of the present disclosure may provide a method by which a terminal, a subscription relay server (SM-DS), and a profile provision server (SM-DP+) exchange messages therebetween.

In accordance with an aspect of the present disclosure, a terminal in a wireless communication system is provided. The terminal includes: a transceiver; and at least one processor, wherein the at least one processor transmits a first message which makes a request for an event to a subscription relay server, receives event-related information from the subscription relay server in response to the first message, transmits a second message which makes a request for an event to a profile provision server, based on the event-related information, and controls the transceiver to receive information related to event processing from the profile provision server in response to the second message.

In accordance with another aspect of the present disclosure, a server for providing a profile in a wireless communication system is provided. The server for providing a profile includes: a transceiver; and at least one processor, wherein the at least one processor controls the transceiver to receive an event request message from a terminal, determines the validity of event-related information included in the event request message, and controls the transceiver to transmit information related to event processing to the terminal, based on the determination of the validity of the event-related information.

In accordance with another aspect of the present disclosure, a subscription relay server in a wireless communication system is provided. The subscription relay server includes: a transceiver; and at least one processor, wherein the at least one processor controls the transceiver to receive an event registration request message from a profile provision server or another subscription relay server in order to register an event and registers the event in response to the event registration request message, and the event pertains to an event generated by the profile provision server.

In accordance with another aspect of the present disclosure, a terminal in a wireless communication system is provided. The terminal includes: a transmitter configured to make a request for an event to a first subscription relay server, a receiver configured to receive one or more events from the first subscription relay server, a controller configured to determine events that do not need to be processed by comparing an event list received from the first subscription relay server with an event-processing exception list, a transmitter configured to access a second subscription relay server or a profile provision server, transmit at least one of an event identifier and information on the first subscription relay server, and make a request for an event that needs to be processed, a receiver configured to receive a response from the second subscription relay server or the profile provision server, and a controller configured to update the event-processing exception list according to the response from the second subscription server or the profile provision server.

In accordance with another aspect of the present disclosure, a profile provision server (SM-DP+) in a wireless communication system is provided. The profile provision server includes a receiver configured to receive an event request including at least one of an event identifier and information on a first subscription relay server from a terminal, a controller configured to determine the validity of the event identifier, a controller configured to prepare a remote SIM provision operation or an error cause corresponding to the event identifier according to validity of the event identifier, a transmitter configured to make a request to delete an event to a subscription relay server on the basis of subscription relay server information provided from the terminal when the event identifier is not valid, and a transmitter configured to transmit a response including the remote SIM provision operation or the error cause to the terminal.

The profile provision server (SM-DP+) in the wireless communication system further includes a controller configured to prepare a remote SIM provision operation and generate an event identifier corresponding thereto and a transmitter configured to make a request for registering an event to the subscription relay server, including at least one of the event identifier, an event expiration time point, and a deletion notification indicator.

In accordance with another aspect of the present disclosure, a subscription relay server (SM-DS) in a wireless communication system is provided. The subscription relay server includes a receiver configured to receive a request for registering an event including at least one of an event identifier, an event expiration time point, and a deletion notification indicator from a profile provision server, a controller configured to determine an event that has not been transferred to a terminal until an event expiration time point, a controller configured to delete the event at the event expiration time point, and a transmitter configured to notify the profile provision server of the deletion of the event.

In accordance with another aspect of the present disclosure, a method of managing an event by a terminal is provided. The method includes: transmitting a first message that requests an event to a subscription relay server; receiving event-related information from the subscription relay server in response to the first message; transmitting a second message that requests an event to a profile provision server, based on the event-related information; and receiving information related to event processing from the profile provision server in response to the second message.

According to an embodiment, the information related to the event processing received from the profile provision server may include information indicating event processing failure.

According to an embodiment, the information related to the event processing transmitted from the profile provision server may include information related to profile installation or remote management.

According to an embodiment, the subscription relay server may include a first subscription relay server and a second subscription relay server.

According to an embodiment, the method may further include transmitting a third message that requests the event to the second subscription relay server on the basis of second event-related information received from the first subscription relay server, receiving first event-related information from the second subscription relay server in response to the third message, and transmitting the second message that requests the event to the profile provision server on the basis of the first event-related information.

According to an embodiment, the second message may further include at least one piece of information related to a path through which the first event-related information is acquired and information related to the second subscription relay server which replies with the first event-related information, and the third message may further include at least one piece of information related to a path through which the second event-related information is acquired and information related to the first subscription relay server which replies with the second event-related information.

According to an embodiment, the method may further include identifying an event processing exception list, determining whether to process the event on the basis of event-related information received from the subscription relay server and the event processing exception list, transmitting the second message that requests the event to the profile provision server on the basis of the determination of whether to process the event and the event-related information by controlling the transceiver, receiving information related to event processing from the profile provision server in response to the second message, and updating the event processing exception list on the basis of the information related to the event processing.

According to an embodiment, the method may further include, when the information related to the event processing received from the profile provision server includes the information indicating the event processing failure, adding the event-related information to the event processing exception list.

In accordance with an aspect of the present disclosure, a method of a profile provision server is provided. The method includes: receiving an event request message from a terminal; determining the validity of event-related information included in the event request message; and transmitting information related to event processing to the terminal, based on the determination of the validity of the event-related information.

According to an embodiment, the event-related information is based on information which the terminal receives from the subscription relay server.

According to an embodiment, when the event-related information is valid, the information related to the event processing may be information related to profile installation or remote management.

According to an embodiment, the method may further include, when the event processing is completed, transmitting an event deletion request message to the subscription relay server.

According to an embodiment, when the event-related information is not valid, the information related to the event processing may include information indicating event processing failure.

According to an embodiment, the event request message may further include at least one piece of information related to a path through which the event-related information is acquired and information related to the subscription relay server, and at least one processor may further include transmitting an event deletion request message to the subscription relay server on the basis of at least one piece of the information related to the path through the event-related information is acquired and the information related to the subscription relay server.

In accordance with an aspect of the present disclosure, a method of a subscription relay server is provided. The method includes receiving an event registration request message from a profile provision server or another subscription relay server in order to register an event and registering the event in response to the event registration request message, and the event may pertain to an event generated by the profile provision server.

According to an embodiment, when the event registration request message is received from the other subscription relay server, the registered event may be an event generated by modulating the event generated by the profile provision server.

According to an embodiment, the method may further include receiving an event deletion request message from the profile provision server and deleting the registered event on the basis of the event deletion request message.

According to an embodiment, the event registration request message includes information related to an event expiration time point and at least one processor may further include deleting the event on the basis of the information related to the event expiration time point.

According to an embodiment, the event registration request message includes information related to event deletion notification and at least one processor may further include notifying the profile provision server of the deletion of the event on the basis of the information related to the event deletion notification.

The technical subjects pursued in the present disclosure may not be limited to the above mentioned technical subjects, and other technical subjects which are not mentioned may be clearly understood, through the following descriptions, by those skilled in the art of the present disclosure.

According to various embodiments, it is possible to provide information of the subscription relay server (SM-DS Info) that was just previously accessed and to assist in deleting an unnecessary event when a terminal accesses the subscription relay server or a profile provision server to make a request for an event.

According to various embodiments, the terminal may separately manage events, of which replies indicating invalidity are received from the subscription relay server or the profile provision server, through an event-processing exception list, and thus, if the terminal once again receives the same event from the subscription relay server in the future, the event is ignored without processing the same.

According to various embodiments, the profile provision server may notify the subscription relay server of an event expiration time point when registering the event, so that the subscription relay server may automatically delete an event left for a predetermined time or longer.

According to various embodiments, the terminal, the subscription relay server, and the profile provision server may reduce resource consumption of network connection and data calculations attributable to unnecessary event processing.

BRIEF DESCRIPTION OF DRAWINGS

The above and other aspects, features, and advantages of the present disclosure will be more apparent from the following detailed description taken in conjunction with the accompanying drawings, in which.

MODE FOR THE INVENTION

Figure 1:
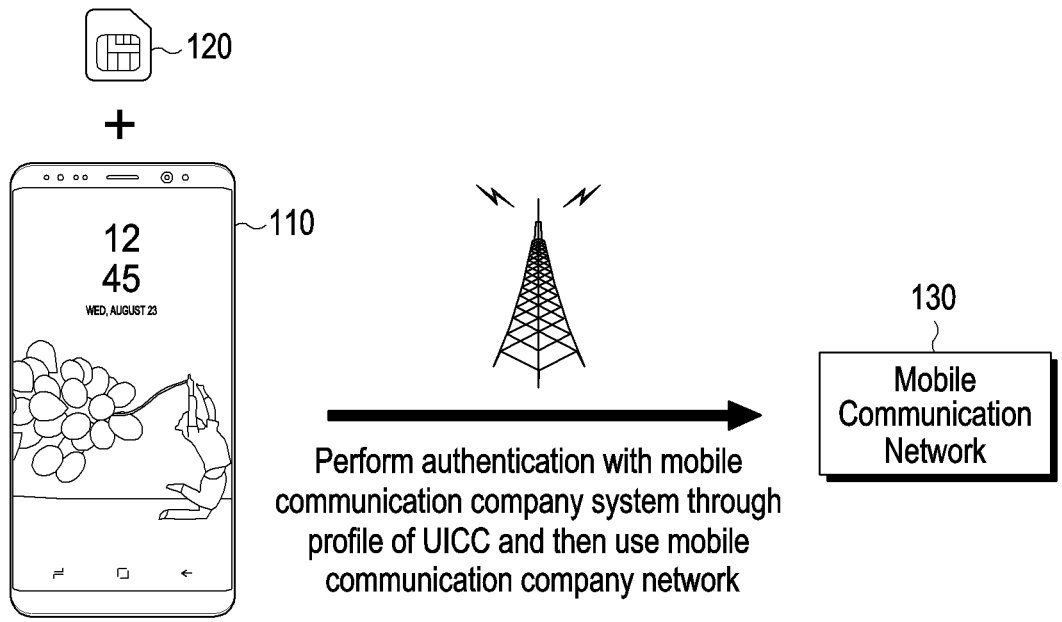
FIG. 1 illustrates a method by which a terminal accesses a mobile communication network using a UICC equipped with a fixed profile according to various embodiments.

Hereinafter, embodiments of the present disclosure will be described in detail with reference to the accompanying drawings.

In describing the exemplary embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, but may be impHereinafter, embodiments of the present disclosure will be described in detail with reference to the accompanying drawings.

In describing the exemplary embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described in detail below in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

The specific terms used herein are provided for ease of understanding the present disclosure, and such specific terms may be changed into other forms without departing from the spirit and scope of the present disclosure.

First, the terms used in this specification will be defined.

A UICC in this specification is a smart card inserted into a mobile communication terminal, and is a chip that stores personal information of a mobile communication subscriber, such as network access authentication information, a phone number list, and SMS information, and performs subscriber authentication and traffic security key generation when a connection is made to a mobile communication network, such as GSM, WCDMA, LTE, etc., thereby making it possible to stably use mobile communication. The UICC may be embedded with a communication application, such as a subscriber identification module (SIM), a universal SIM (USIM), an IP multimedia SIM (ISIM), and the like according to the type of mobile communication network to which a subscriber connects, and may provide a higher level security function for loading various applications, such as an electronic wallet, ticketing, an electronic passport, and the like.

An embedded UICC (eUICC) in this specification is a security module in the shape of a chip embedded in a terminal, but not a detachable module that can be inserted into and detached from a terminal. The eUICC may be installed by downloading a profile using Over-The-Air (OTA) technology. The eUICC may be referred to as a UICC capable of downloading and installing a profile.

Herein, a method of installing an eUICC by downloading a profile using OTA technology may be applied to a detachable UICC that can be inserted into and detached from a terminal. That is, an embodiment of the present disclosure may be applied to a UICC that can be installed by downloading a profile using OTA technology.

The term "UICC" in this specification may be used interchangeably with the term "SIM," and the term "eUICC" may be used interchangeably with the term "eSIM."

A profile in this specification is an entity in which an application, a file system, an authentication key, etc. to be stored in a UICC are packaged in a software format.

A USIM profile in this specification may be the same as a profile, or may be an entity in which information incorporated in a USIM application in a profile is packaged in a software format.

In this specification, a profile provision server may include a function of generating a profile, encrypting the generated profile, generating a profile remote management command, or encrypting the generated profile remote management command, and may be expressed as Subscription Manager Data Preparation (SM-DP), Subscription Manager Data Preparation Plus (SM-DP+), an off-card entity of profile domain, a profile encryption server, a profile generation server, a Profile Provisioner (PP), a profile provider, or a Profile Provisioning Credentials (PPC) holder.

In this specification, a profile management server may be expressed as Subscription Manager Secure Routing (SM-SR), Subscription Manager Secure Routing Plus (SM-SR+), an off-card entity of eUICC profile manager, a Profile Management Credentials (PMC) holder, or an eUICC Manager (EM).

In this specification, the profile provision server may be referred to as a combination of functions of the profile management server. Accordingly, the operation of the profile provision server may be performed by the profile management server in various embodiments of the present disclosure, that is, in later technologies. Similarly, the operation for the profile management server or the SM-SR can be performed by the profile provision server.

In this specification, a subscription relay server may be expressed as a Subscription Manager Discovery Service (SM-DS), a Discovery Service (DS), a root SM-DS, or alternative SM-DS. The subscription relay server may receive an event registration request (Register Event Request or Event Register Request) from one or more of the profile provision server and the subscription relay server. Further, more than one subscription relay server may be used together, in which case a first subscription relay server may receive an event registration request not only from the profile provision server, but also from the second subscription relay server.

In this specification, the profile provision server and the subscription relay server may be collectively called a "Remote SIM Provisioning (RSP) server". The RSP server may be expressed as Subscription Manager (SM)-XX.

The term "terminal" used in this specification may refer to a mobile station (MS), user equipment (UE), a user terminal (UT), a wireless terminal, an access terminal (AT), another kind of terminal, a subscriber unit, a subscriber station (SS), a wireless device, a wireless communication device, a wireless transmission/reception unit (WTRU), a moving node, a mobile device, or other devices. Various embodiments of a terminal may include a cellular phone, a smart phone having a wireless communication function, a personal digital assistant (PDA) having a wireless communication function, a wireless modem, a portable computer having a wireless communication function, a photographing device, such as a digital camera, having a wireless communication function, a gaming device having a wireless communication function, a home appliance for storing and reproducing music that has a wireless communication function, an Internet home appliance capable of performing wireless Internet access and browsing, and portable units or terminals having integrated combinations of functions thereof. Furthermore, a terminal may include, but is not limited to, a machine-to-machine (M2M) terminal and a machine-type communication (MTC) terminal/device. In this specification, the terminal may be referred to as an electronic device.

In this specification, the electronic device may have a UICC that can be embedded therein by downloading the profile. When the UICC is not embedded into the electronic device, the UICC physically separate from the electronic device may be inserted into the electronic device and connected thereto. For example, the UICC may be inserted into the electronic device in a card form. The electronic device may include the terminal, and at this time the terminal may be a terminal including a UICC that can be installed by downloading the profile. As described above, the UICC may be embedded into the terminal. If the terminal and the UICC are separate from each other, the UICC may be inserted into the terminal and connected thereto. The UICC that can be installed by downloading the profile may be, for example, an eUICC.

In this specification, the terminal or the electronic device may include software or an application installed in the terminal or the electronic device to control the UICC or the eUICC. The software or the application may be, for example, a Local Profile Assistant (LPA).

A profile separator may be a profile ID, an Integrated Circuit Card ID (ICCID), a matching ID, an event ID, an activation code, an activation code token, an ISD-P, or a factor matching a Profile Domain (PD). The profile ID may represent a unique identifier of each profile. The profile separator may include the address of the profile provision server (SM-DP+) that indexes the profile.

In the specification, an eUICC ID may be a unique identifier of the eUICC embedded into the terminal, and may be referred to as an EID. Further, when the provisioning profile is pre-installed in the eUICC, the eUICC ID may be the profile ID of the corresponding provisioning profile. According to an embodiment of the present disclosure, when the terminal and the eUICC chip are not separately provided, the eUICC ID may be a terminal ID. The eUICC ID may refer to a particular secure domain of the eUICC chip.

In this specification, a profile container may also be referred to as a profile domain. The profile container may be a security domain.

In this specification, an Application Protocol Data Unit (APDU) may be a message by which the terminal is linked to the eUICC. The APDU may be a message by which the PP or PM is linked to the eUICC.

In this specification, Profile Provisioning Credentials (PPC) may be a means used for performing mutual authentication between the profile provision server and the eUICC, encrypting a profile, and signing. The PPC may include one or more of a symmetric key, a Rivest-Shamir-Adleman (RSA) authentication certificate and a private key, an Elliptic Curved Cryptography (ECC) authentication certificate and a private key, and a root Certification Authority (CA) and an authentication certificate chain. Further, when the number of profile provision servers is plural, different PPCs for the plurality of respective profile provision servers may be stored in the eUICC and used.

In this specification, Profile Management Credentials (PMC) may be a means used for performing mutual authentication between the profile provision server and the eUICC, encrypting a profile, and signing. The PMC may include one or more of a symmetric key, an RSA authentication certificate and a private key, an ECC authentication certificate and a private key, and a root CA and an authentication certificate chain. Further, when the number of profile management servers is plural, different PMCs for the plurality of respective profile management servers may be stored in the eUICC and used.

In this specification, an AID may be an application identifier. The AID may be an identifier for identifying different applications within the eUICC.

In this specification, the term "event" may collectively indicate profile download, remote profile management, and management/processing instructions of other profiles or the eUICC. The event may be a remote SIM provisioning operation, RSP operation, or event record, and each event may be associated with data including one or more of an event identifier (event ID or EventID), a matching identifier (matching ID or MatchingID), and an address (FQDN, IP address, or URL) of the profile provision server (SM-DP+) or the subscription relay server (SM-DS) storing the corresponding event. The term "profile download" may be interchangeably used with "profile installation". The term "event type" may be a term indicating whether a particular event is a profile download, remote profile management, or may indicate a management/processing command of another profile or an eUICC, and the operation type (Operation-Type), operation class (OperationClass), event request type, event class, or event request class.

In this specification, the term "profile package" may be interchangeably used with "profile" or may be used as a term indicating a data object of a particular profile, and may be a Profile TLV or a Profile Package TLV. When the profile package is encrypted using an encryption parameter, the profile package may be a Protected Profile Package (PPP) or a protected profile package TLV (PPP TLV). When the profile package is encrypted using an encryption parameter that can be decrypted by only a particular eUICC, the profile package may be a Bound Profile Package (BPP) or a BPP TLV. The profile package TLV may be a data set indicating information which configures a profile in a Tag, Length, and Value (TLV) format.

In this specification, Remote Profile Management (RPM) may be profile remote management, remote management, a remote management command, a remote command, an RPM package, a profile remote management package, a remote management package, a remote management command package, or a remote command package. The RPM may be used to change the state of a particular profile (enabled, disabled, or deleted) or to update the content of a particular profile (for example, a profile nickname) or abstract profile information (profile metadata). The RPM may include one or more remote management commands, in which case the profiles pertaining to each remote management command may be the same as or different from each other according to the remote management command.

In this specification, a certificate or a digital certificate may be a digital certificate used for mutual authentication based on an asymmetric key consisting of a pair of a Public Key (PK) and a Secret Key (SK). Each certificate may include one or more PKs, a Public Key Identifier (PKID) corresponding to the respective PKs, the ID of the Certificate Issuer (CI) that issues the corresponding certificate, and a digital signature. The certificate issuer may be a certification issuer, Certificate Authority (CA), or certification authority. In this specification, the terms "PK" and "PKID" may be interchangeably used to indicate a particular PK, a certificate including the corresponding PK, part of the particular PK, part of the certificate including the corresponding PK, the value of a calculation result (for example, a hash) of the particular PK, the value of a calculation result (for example, a hash) of the part of the particular PK, the value of a calculation result (for example, a hash) of the part of the certificate including the corresponding PK, or a storage space storing the data.

In this specification, when certificates (primary certificates) issued by one certificate issuer are used for issuing other certificates (secondary certificates) or when secondary certificates are used for successively issuing tertiary or higher certificates, the relationship between the corresponding certificates may be named a certificate chain or a certificate hierarchy. At this time, a CI certificate used for issuing a first certificate may be referred to as a root certificate, highest certificate, root CI, root CI certificate, root CA, or root CA certificate.

In this specification, the AKA may indicate authentication and key agreement, and corresponds to an authentication algorithm for accessing 3GPP and 3GPP2 networks.

In this specification, K is an encryption key value stored in the eUICC used for an AKA authentication algorithm.

In this specification, Operator Constant (OPc) is a parameter value which may be stored in the eUICC used for the AKA authentication algorithm.

In this specification, NAA is a network access application and may be an application such as a USIM or an ISIM stored in the UICC to access the network. The NAA may be a network access module.

Further, in the following description of the present disclosure, a detailed description of known functions and configurations incorporated herein will be omitted when the same may make the subject matter of the present disclosure rather unclear.

FIG. 1 illustrates a method of connecting a mobile communication network by a terminal using a UICC equipped with a profile fixed to the terminal according to various embodiments.

As illustrated in FIG. 1, a UICC 120 may be inserted into a terminal 110. For example, the UICC 120 may be removable or may be embedded into the terminal in advance.

The fixed profile of the UICC equipped with the fixed profile means that "access information" for access to a particular telecommunication company is fixed. For example, access information may be an IMSI, which is a subscriber identifier, or K or Ki required for authenticating a network together with the subscriber identifier.

The terminal 110, according to various embodiments, may perform authentication together with an authentication system (for example, a Home Location Register (HLR)) of a mobile communication company through the UICC 120. For example, an authentication process may be an Authentication and Key Agreement (AKA) process. When the terminal succeeds in authentication, the terminal may use a mobile communication service such as a telephone or mobile data service through a mobile communication network 130 of a mobile communication system.

Figure 2:
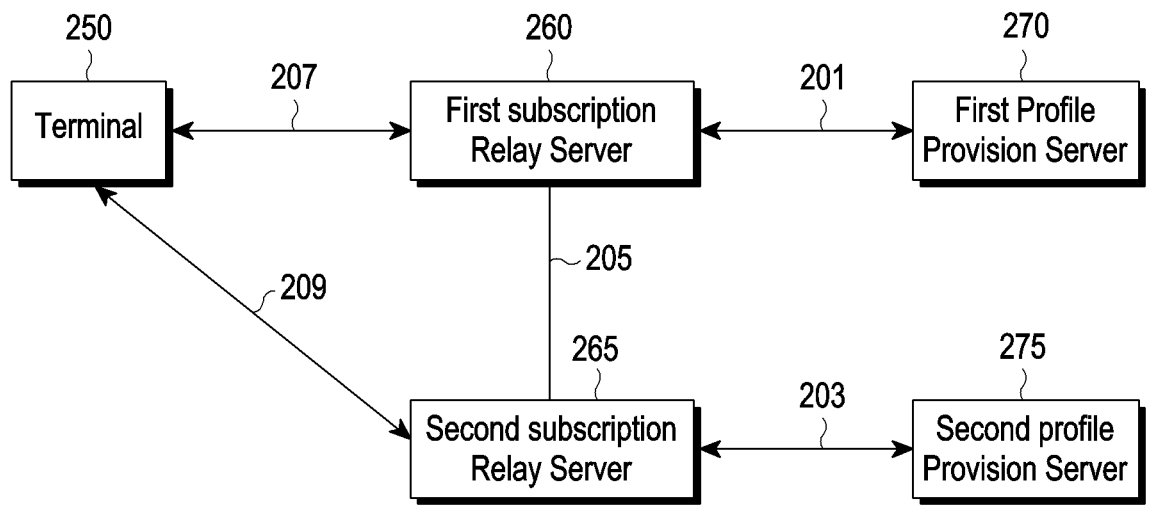
FIG. 2 illustrates an example of connections between a terminal, a subscription relay server, and a profile provision server according to various embodiments.

FIG. 2 illustrates an example of connections between a terminal, a subscription relay server, and a profile provision server according to various embodiments.

As illustrated in FIG. 2, a terminal 250 may be connected to a first subscription relay server 260 through a link 207 and to a second subscription relay server 265 through a link 209.

For example, addresses (Fully Qualified Domain Name (FQDN), IP, or Uniform Resource Locator (URL)) of the first subscription relay server 260 and the second subscription relay server 265 may be stored in the terminal 250 or an eUICC included in the terminal. Further, when only the address of the first subscription relay server 260 is stored in the terminal 250 or the eUICC included in the terminal, the address of the second subscription relay server 265 may be made known to the terminal through the first subscription relay server 260. To this end, the second subscription relay server 265 may register its own address in the first subscription relay server 260 through the link 205.

As illustrated in FIG. 2, the first subscription relay server 260 may be connected to a first profile provision server 270 through a link 201. For example, the first profile provision server 270 may generate a particular event and register the generation of the corresponding event in the first subscription relay server 260 through the link 201.

As illustrated in FIG. 2, a second profile provision server 275 may be indirectly connected to the first subscription relay server 260 through the second subscription relay server 265. For example, the second profile provision server 275 may generate a particular event, and when registering the generation of the corresponding event in the second subscription relay server 265 through a link 203, may request forwarding the corresponding event to the first subscription relay server 260. In this case, the second subscription relay server 265 may re-register the event of the second profile provision server 275 in the first subscription relay server 260 through the link 205.

A detailed operation and a message exchange procedure between the terminal 250, the first subscription relay server 260, the second subscription relay server 265, the first profile provision server 270, and the second profile provision server 275 will be described in detail below with reference to FIGS. 3 and 4.

Figure 3:
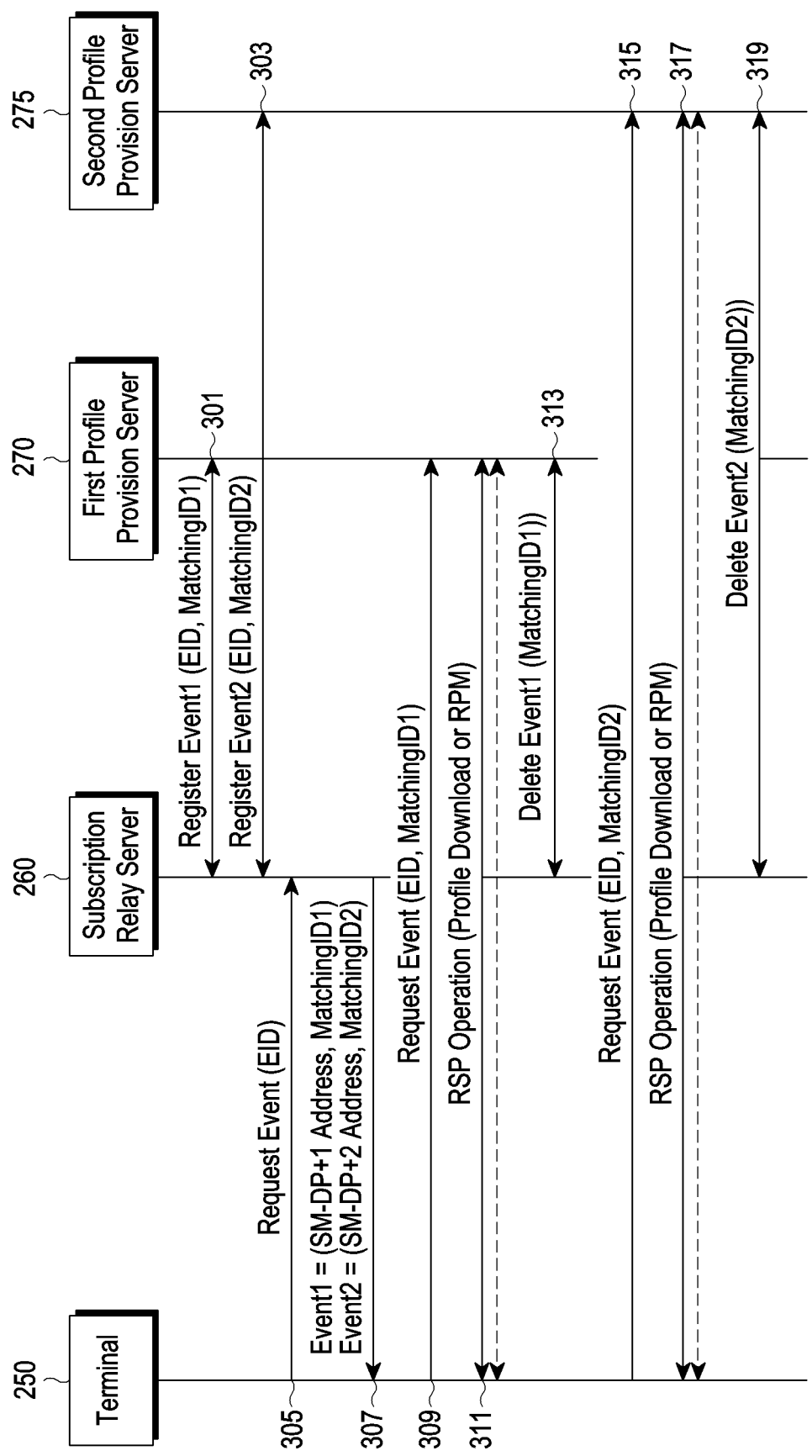
FIG. 3 illustrates an example of a message exchange procedure when the subscription relay server operates while being connected to at least one profile provision server according to various embodiments.

FIG. 3 illustrates an example of a message exchange procedure when the subscription relay server operates while being connected to at least one profile provision server according to various embodiments.

As illustrated in FIG. 3, in operation 301, the first profile provision server 270 may generate a first event (Event1) and register the generated first event (Register Event1) in the subscription relay server 260. For example, operation 301 of registering the first event may include an operation in which the first profile provision server 270 transmits an event registration request message (Register Event Request) including at least one of a first event identifier (MatchingID1), an identifier of an eUICC within the terminal 250 (eUICC ID or EID), an address of the first profile provision server 270 (SM-DP+1 address), and a forwarding indicator set as "false" to the subscription relay server 260, and an operation in which the subscription relay server 260 replies with an event registration response message (register event response) in order to notify the first profile provision server 270 of the result of the event registration. For convenience of illustration, although it is illustrated that only the eUICC identifier (EID) and the first event identifier (matching ID1) are used in operation 301 of FIG. 3, the registration of the event may include the exchange between the event registration request message (register event request) and the event registration response message (register event response), and it is noted that the event registration request message may include at least one of the above-described factors (that is, the event ID, the eUICC ID, the profile provision server address, and the forwarding indicator). The forwarding indicator may be omitted, in which case it should be noted that the subscription relay server 260 may set the forwarding indicator as "false" by default. Such notes may be equally applied to the following drawings.

In operation 303, the second profile provision server 275 may generate a second event (Event2) and register the generated second event (Register Event2) in the subscription relay server 260. For example, operation 303 of registering the second event may include an operation in which the second profile provision server 275 transmits an event registration request message (Register Event Request) including at least one of a second event identifier (MatchingID2), an identifier of an eUICC within the terminal 250 (eUICC ID or EID), an address of the second profile provision server 275 (SM-DP+2 address), and a forwarding indicator set as "false" to the subscription relay server 260, and an operation in which the subscription relay server 260 replies with an event registration response message (register event response) in order to notify the second profile provision server 270 of the result of the event registration.

In operation 305, the terminal 250 may transmit a message that requests an event to the subscription relay server 260. For example, the event request (Request Event) in operation 305 may use a terminal authentication request message (authenticate client request) including the identifier (eUICC ID or EID) of the eUICC within the terminal 250.

In operation 307, the subscription relay server 260 may reply with an event list to the terminal 250.

For example, the event list may include a list of events registered in the eUICC within the terminal 250 up to that point in time. Further, the event list may include information on events.

In FIG. 3, an example of replying with information related to a first event and information related to a second event registered in operations 301 and 303 will be described. For example, information on the first event (Event1=(SM-DP+1 Address, MatchingID1)) included in the event list may include at least one of an address of the first profile provision server 270 (SM-DP+1 Address) and a first event identifier (MatchingID1), and information on the second event (Event2=(SM-DP+2 Address, MatchingID2)) included in the event list may include at least one of an address of the second profile provision server 275 (SM-DP+2 Address) and a second event identifier (MatchingID2).

For example, the reply with the event list of operation 307 may use a terminal authentication response message (authenticate client response).

For example, events within the event list may be arranged in chronological order of the events registered in the subscription relay server 260.

Thereafter, the terminal 250 may process the first event and the second event in operations 309 to 315.

In operation 309, the terminal 250 may transmit a message that requests the first event to the first profile provision server 270. For example, the event request (Request Event) in operation 309 may use a terminal authentication request message (authenticate client request) including at least one of the identifier (eUICC ID or EID) of the eUICC within the terminal 250 and the first event identifier (MatchingID1) received in operation 307.

In operation 311, the terminal 250 and the first profile provision server 270 may perform an RSP operation (profile installation, remote management, or RSP operation (Profile Download or RPM)) corresponding to the first event identifier (MatchingID1). For example, operation 311 may further include one or more message exchanges between the terminal 250 and the first profile provision server 270, and the first message that the first profile provision server 270 sends in reply to the terminal 250 may be a terminal authentication response message (authenticate client response).

Since the first profile provision server 270 has completely processed the first event, the first profile provision server 270 may request the deletion of the first event (Delete Event1) to the subscription relay server 260 in operation 313. For example, operation 313 may include an operation in which the first profile provision server 270 transmits an event deletion request message (Delete Event Request) including at least one of the identifier (eUICC or EID) of the eUICC within the terminal 250 and the first event identifier (MatchingID1) to the subscription relay server 260 and an operation in which the subscription relay server 260 replies with an event deletion response message (Delete Event Response) in order to notify the first profile provision server 270 of the event deletion result.

In operation 315, the terminal 250 may transmit a message that requests the second event to the second profile provision server 275. For example, the event request (Request Event) in operation 315 may use a terminal authentication request message (authenticate client request) including at least one of the identifier (eUICC ID or EID) of the eUICC within the terminal 250 and the second event identifier (MatchingID2) received in operation 307.

In operation 317, the terminal 250 and the second profile provision server 275 may perform an RSP operation (profile installation, remote management, or RSP operation (Profile Download or RPM)) corresponding to the second event identifier (MatchingID2). For example, operation 317 may further include one or more message exchanges between the terminal 250 and the second profile provision server 275, and the first message that the second profile provision server 275 sends in reply to the terminal 250 may be a terminal authentication response message (authenticate client response).

Since the second profile provision server 275 has completely processed the second event, the second profile provision server 275 may send a request for the deletion of the second event (Delete Event2) to the subscription relay server 260 in operation 319. For example, operation 319 may include an operation in which the second profile provision server 275 transmits an event deletion request message (Delete Event Request) including at least one of the identifier (eUICC or EID) of the eUICC within the terminal 250 and the second event identifier (matching ID2) to the subscription relay server 260 and an operation in which the subscription relay server 260 replies with an event deletion response message (Delete Event Response) in order to notify the second profile provision server 275 of the event deletion result.

Meanwhile, FIG. 3 illustrates an example in which each of the two profile provisions servers generates one event, but it should be noted that the message exchange procedure may be expanded according to the number of profile provision servers and the number of events generated by each profile provision server.

Figure 4:
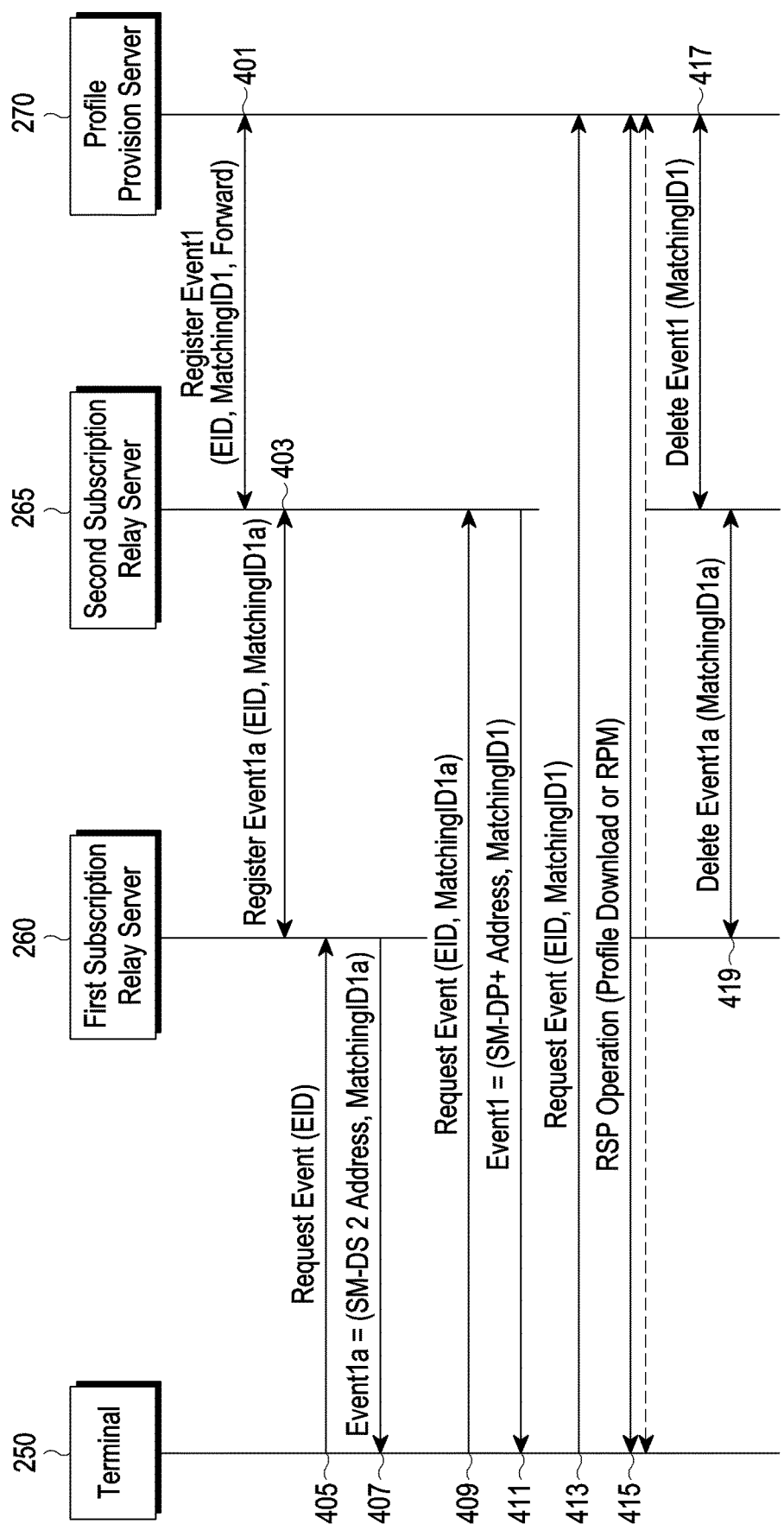
FIG. 4 illustrates an example of a message exchange procedure when the profile provision server operates while being connected to at least one subscription relay server according to various embodiments.

FIG. 4 illustrates an example of a message exchange procedure when the profile provision server operates while being connected to at least one subscription relay server according to various embodiments.

As illustrated in FIG. 4, the profile provision server 270 may generate a first event and register the generated first event in the second subscription relay server 265 in operation 401. For example, operation 401 of registering the first event (Register Event1) may include an operation in which the profile provision server 270 transmits an event register request message (Register Event Request) including at least one of a first event identifier (MatchingID1), an identifier of an eUICC within the terminal 250 (eUICC ID or EID), an address of the profile provision server 270 (SM-DP+ address), and a forwarding indicator (or Forward) set as "true" to the second subscription relay server 265, and an operation in which the second subscription relay server 265 replies with an event registration response message (register event response) in order to notify the profile provision server 270 of the result of the event registration.

In operation 403, the second subscription relay server 265 may re-register the first event (Register Event1a) in the first subscription relay server 260 according to the forwarding indicator set as "true" of operation 401. For example, operation 403 of re-registering the first event may include an operation in which the second profile provision server 265 transmits an event registration request message (Register Event Request) including at least one of a modulated first event identifier (MatchingID1a), an identifier of an eUICC (eUICC ID or EID) within the terminal 250, the address of the second profile provision server 265 (SM-DS2 Address), and a forwarding indicator set as "false" to the first subscription relay server 260 and an operation in which the first subscription relay server 260 replies with an event registration response message (register event response) in order to notify the second subscription relay server 265 of the result of the event registration. For example, the modulated first event identifier (matching ID1a) may be the same as the first event identifier (MatchingID1).

In operation 405, the terminal 250 may transmit a message that requests an event to the first subscription relay server 260. For example, the event request (Request Event) in operation 405 may use a terminal authentication request message (authenticate client request) including the identifier (eUICC ID or EID) of the eUICC within the terminal 250.

In operation 407, the first subscription relay server 260 may reply with an event list to the terminal 250 (Event1a= (SM-DS 2 Address, MatchingID1a)). For example, the event list may include a list of events registered in the eUICC within the terminal 250 up to that point in time. Further, the event list may include information on events.

In FIG. 4, an example of replying with information on the re-registered first event in operation 403 will be described. For example, the information on the re-registered first event included in the event list may include at least one of the address of the second subscription relay server 265 and the modulated first event identifier (MatchingID1a).

Further, the reply with the event list of operation 407 may use a terminal authentication response message (authenticate client response).

For example, events within the event list may be arranged in chronological order of the events registered in the subscription relay server 260.

In operation 409, the terminal 250 may transmit a message that requests the modulated first event to the second subscription relay server 265. For example, the event request (Request Event) in operation 409 may use a terminal authentication request message (authenticate client request) including at least one of the identifier (eUICC ID or EID) of the eUICC within the terminal 250 and the modulated first event identifier (MatchingID1a) received in operation 407.

In operation 411, the second subscription relay server 265 may reply with an event list to the terminal 250 (Event1= (SM-DP+ Address, MatchingID1)). For example, the event list may include a list of events registered in the eUICC within the terminal 250 up to that point in time. Further, the event list may include information on events.

In FIG. 4 an example of replying with the information on the first event registered in operation 401 will be described. For example, the information on the first event included in the event list may include at least one of the address of the profile provision server 270 and the first event identifier (MatchingID1). Further, the reply with the event list of operation 411 may use a terminal authentication response message (authenticate client response).

In operation 413, the terminal 250 may transmit a message that requests the first event to the profile provision server 270. For example, the event request (Request Event) in operation 413 may use a terminal authentication request message (authenticate client request) including at least one of the identifier (eUICC ID or EID) of the eUICC within the terminal 250 and the first event identifier (MatchingID1) received in operation 411.

In operation 415, the terminal 250 and the profile provision server 270 may perform an RSP operation (profile installation, remote management, or RSP operation (Profile Download or RPM)) corresponding to the first event identifier (MatchingID1). For example, operation 415 may further include one or more message exchanges between the terminal 250 and the profile provision server 270, and the first message that the profile provision server 270 sends in reply to the terminal 250 may be a terminal authentication response message (authenticate client response).

Since the profile provision server 270 has completely processed the first event, the profile provision server 270 may send a request to delete the first event (Delete Event1) to the second subscription relay server 265 in operation 417. For example, operation 417 may include an operation in which the profile provision server 270 transmits an event deletion request message (Delete Event Request) including at least one of the identifier (eUICC or EID) of the eUICC within the terminal 250 and the first event identifier (MatchingID1) to the second subscription relay server 265 and an operation in which the second subscription relay server 265 replies with an event deletion response message (Delete Event Response) in order to notify the profile provision server 270 of the event deletion result.

Since the first event has been completely processed, the second subscription relay server 265 may send a request to delete the re-registered first event (Delete Event1a) to the first subscription relay server 260 in operation 419. For example, operation 419 may include an operation in which the second subscription relay server 265 transmits an event deletion request message (Delete Event Request) including at least one of the identifier (eUICC or EID) of the eUICC within the terminal 250 and a modulated first event identifier (MatchingID1a) to the first subscription relay server 260 and an operation in which the first subscription relay server 260 replies with an event deletion response message (Delete Event Request) in order to notify the second subscription relay server 265 of the event deletion result.

Meanwhile, FIG. 4 illustrates the case in which two subscription relay servers are used for re-registration of the event, but the case may be expanded to the case in which more than two subscription relay servers are used. Further, a combination of the example of FIG. 4 and the example of FIG. 3 may be applied, and thus each of a plurality of events generated by a plurality of profile provision servers may be registered two or more times again and made known to the terminal through the subscription relay server.

Figure 5:
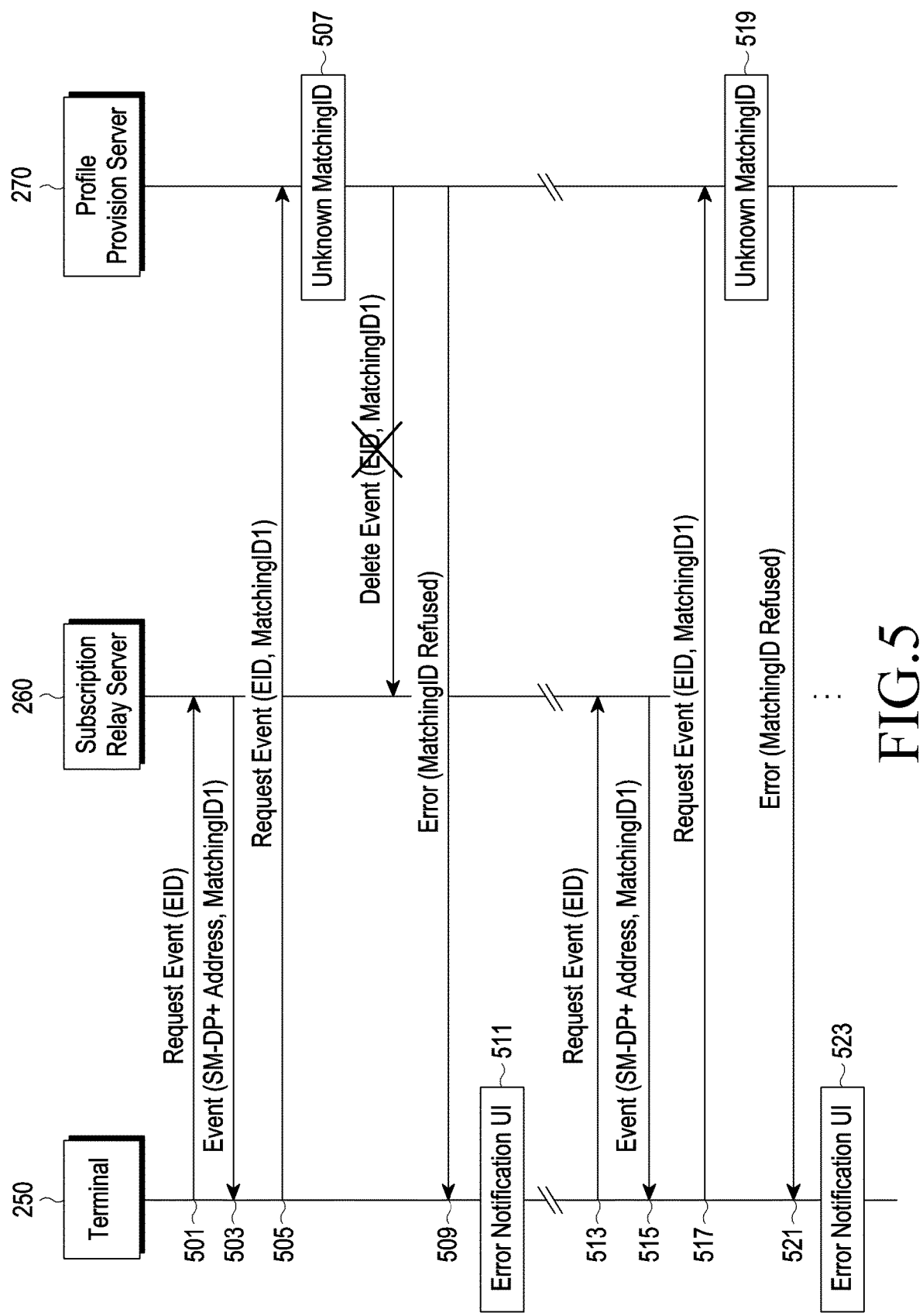
FIG. 5 illustrates the effects of an unclear event left in the subscription relay server on the profile provisions server and the terminal according to various embodiments.

FIG. 5 illustrates the effects of an unclear event left in the subscription relay server on the profile provisions server and the terminal according to various embodiments.

As illustrated in FIG. 5, the terminal 250 may transmit a message that requests an event to the subscription relay server 260 in operation 501. For example, the event request (Request Event) in operation 501 may use a terminal authentication request message (authenticate client request) including the identifier (eUICC ID or EID) of the eUICC within the terminal 250.

In operation 503, the subscription relay server 260 may reply with an event list to the terminal 250 (Event1(SM-DP+ Address, MatchingID1)). For example, the event list may include a list of events registered in the eUICC within the terminal 250 up to that point in time. Further, the event list may include information on events.

FIG. 5 illustrates an example in which the subscription relay server 260 replies with information on a first event left in the subscription relay server 260 to the terminal 250. For example, the information on the first event included in the event list may include at least one of the address of the profile provision server 270 and the first event identifier (MatchingID1). Further, the reply with the event list of operation 503 may use a terminal authentication response message (authenticate client response).

In operation 505, the terminal 250 may transmit a message that that requests the first event to the profile provision server 270. For example, the event request (Request Event) in operation 505 may use a terminal authentication request message (authenticate client request) including at least one of the identifier (eUICC ID or EID) of the eUICC within the terminal 250 and the first event identifier (MatchingID1) received in operation 503.

In operation 507, the profile provision server 270 may determine that the first event identifier (MatchingID1) received in operation 505 is an event identifier that cannot be recognized (Unknown MatchingID) and thus cannot be processed.

The cases in which an event identifier that cannot be recognized by the profile provision server 270, according to various embodiments, exists in the subscription relay server 260 are as follows, but are not limited thereto.

Failure of an event deletion procedure of a pre-processed event (see operations 313 to 319 of FIG. 3)

Error in the management of an internal database in a subscription relay server (event state management)

Error in an internal operation of a profile provision server (profile state management or remote management command package management)

Failure of synchronization of an event state due to a communication error between a profile provision server and a subscription relay server It is preferable that the profile provision server 270 attempts to delete the first event according to the determination result of operation 507. However, since the first event identifier cannot be recognized, unlike operation 313 or 319 of FIG. 3, the subscription relay server 260 storing the first event also cannot recognize the first event identifier, and accordingly cannot delete the first event. As a result, the first event corresponding to the event identifier that the profile provision server 270 cannot recognize remains registered in the subscription relay server 260.

In operation 509, the profile provision server 270 may notify the terminal 250 of a message indicating that the first event identifier received in operation 505 cannot be recognized. For example, the message (Error) of operation 509 may be a terminal authentication response message (authenticate client response) including the error cause. Further, the error cause included in the message of operation 509 may be a character string or a number string indicating "event identifier refused (matching ID refused)".

In operation 511, the terminal 250 may provide a notification of the error message received in operation 509 through a User Interface (UI) (Error Notification UI).

Thereafter, in operations 513 to 523, the terminal 250 and the profile provision server 270 may repeat operations 501 to 511 one or more times. For example, as long as the first event is not deleted in the subscription relay server 260, the terminal 250 continuously receives the first event from the subscription relay server 260 and attempts to continuously process the first event, which the terminal 250 and the profile provision server 270 cannot recognize; so there is a disadvantage in that resources are consumed for unnecessary network connection and data calculations.

Figure 6:
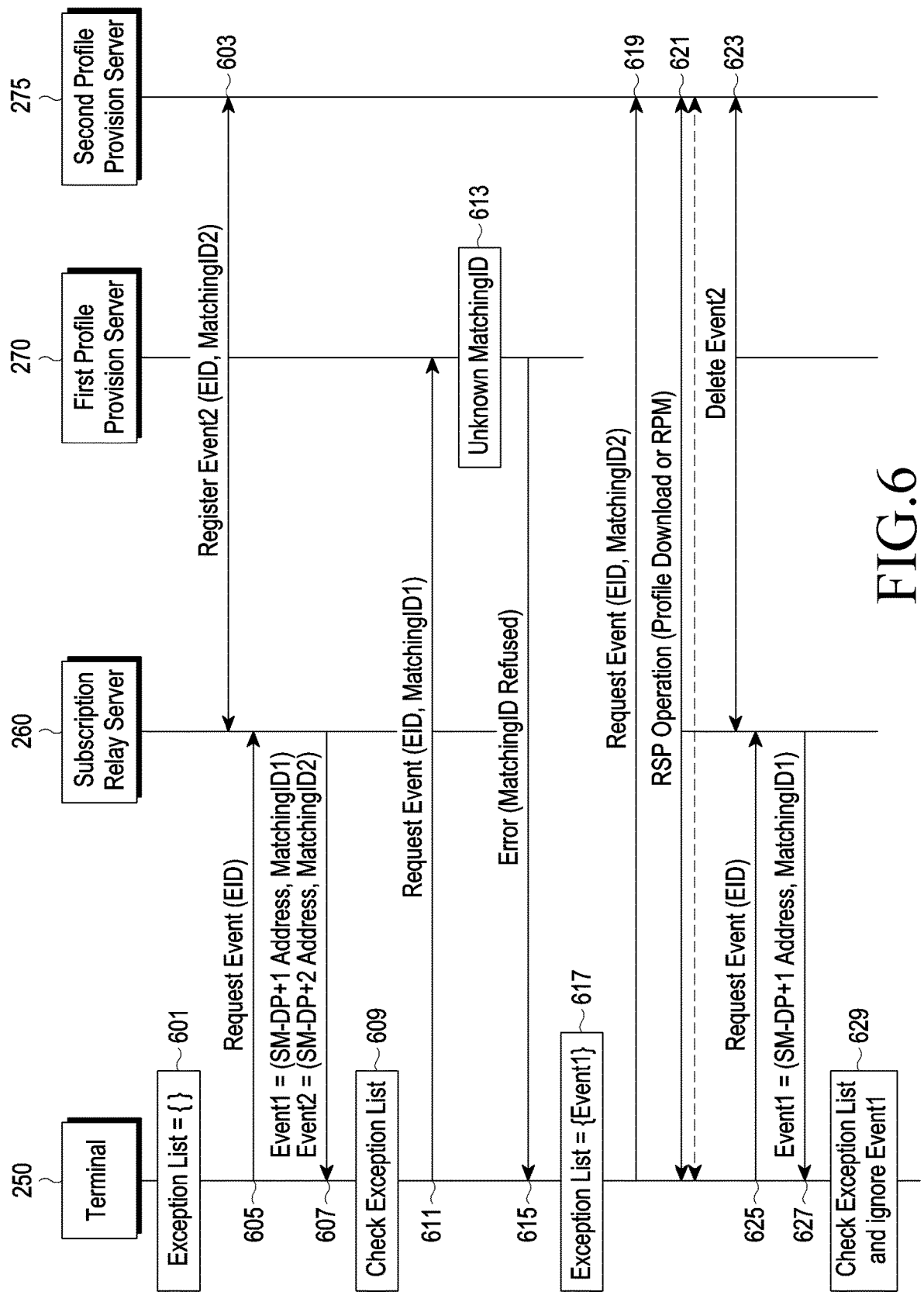
FIG. 6 illustrates a procedure in which the terminal manages an event-processing exception list according to various embodiments.

FIG. 6 illustrates a procedure in which the terminal manages an event-processing exception list according to various embodiments.

As illustrated in FIG. 6, in operation 601, the terminal 250 may make an event-processing exception list. For example, the event-processing exception list (Exception List={ }) may store one or more events, which the terminal 250 receives from the subscription relay server 260 but ignores without processing.

FIG. 6 illustrates the case in which the event-processing exception list is first made in operation 601. For example, the event-processing exception list may be first made or initialized at the time point at which the terminal is manufactured or a factory reset is performed. Further, the event-processing exception list first made in operation 601 may include no event.

In operation 603, the second profile provision server 275 may generate a second event and register the generated second event in the subscription relay server 260. For example, operation 603 of registering the second event (Register Event2) may include an operation in which the second profile provision server 275 transmits an event register request message (Register Event Request) including at least one of a second event identifier (MatchingID2), an identifier of an eUICC (eUICC ID or EID) within the terminal 250, an address of the second profile provision server 275 (SM-DP+2 Address), and a forwarding indicator set as "false" to the subscription relay server 260 and an operation in which the subscription relay server 260 replies with an event register response message (register event response) in order to notify the second profile provision server 275 of the result of the event registration.

In operation 605, the terminal 250 may transmit a message that requests an event to the subscription relay server 260. For example, the event request (Request Event) in operation 605 may use a terminal authentication request message (authenticate client request) including the identifier (eUICC ID or EID) of the eUICC within the terminal 250.

In operation 607, the subscription relay server 260 may reply with an event list to the terminal 250. For example, the event list may include a list of events registered in the eUICC within the terminal 250 up to that point in time. Further, the event list may include information on events. FIG. 6 illustrates an example of replying with the information related to the first event left in the subscription relay server 260 and the information related to the second event registered in operation 603 on the basis of the cause described in operation 507 of FIG. 5. For example, the information on the first event (Event1=(SM-DP+1 Address, MatchingID1)) included in the event list may include at least one of an address of the first profile provision server 270 (SM-DP+1 Address) and a first event identifier (MatchingID1), and the information on the second event (Event2= (SM-DP+2 Address, MatchingID2)) included in the event list may include at least one of an address of the second profile provision server 275 (SM-DP+2 Address) and a second event identifier (matching ID2). Further, the reply with the event list of operation 607 may use a terminal authentication response message (authenticate client response).

In operation 609, the terminal 250 may compare the event list (Check Exception List) received from the subscription relay server 260 in operation 607 with the event-processing exception list. For example, since the event-processing exception list is empty, all events in the event list may be processed in operation 609. Thereafter, the terminal may attempt to process the first event and the second event in operation 611 and operation 619.

In operation 611, the terminal 250 may transmit a message that requests the first event to the first profile provision server 270. For example, the event request (Request Event) in operation 611 may use a terminal authentication request message (authenticate client request) including at least one of the identifier (eUICC ID or EID) of the eUICC within the terminal 250 and the first event identifier (MatchingID1) received in operation 607.

In operation 613, the first profile provision server 270 may determine that the first event identifier (MatchingID1) received in operation 611 is an event identifier that cannot be recognized (Unknown MatchingID) and thus cannot be processed. For example, an example of the case in which an event identifier that cannot be recognized by the profile provision server exists in the subscription relay server 260 refers to the description of operation 507 of FIG. 5.

In operation 615, the first profile provision server 270 may notify the terminal 250 of a message (Error) indicating that the first event identifier received in operation 611 cannot be recognized. For example, the message of operation 615 may be a terminal authentication response message (authenticate client response) including the error cause. Further, an error cause included in the message of operation 615 may be a character string or a number string indicating "event identifier refused (matching ID refused)".

Since the first profile provision server 270 provides a notification of the error cause of "event identifier refused (MatchingID Refused)" on the basis of the processing result of the first event in operation 615, the terminal 250 may add the first event to the event-processing exception list (Exception List={Event1}) in operation 617.

Although FIG. 6 illustrates an embodiment of adding the first event to the event-processing exception list when one attempt to process the first event fails, an event of which processing fails two or more times may be added to the event-processing exception list according to settings of the terminal.

Although FIG. 6 illustrates an embodiment in which the profile provision server provides a notification of the error cause of "event identifier refused (MatchingID Refused)" as a reference for determining failure in processing the event, it may be noted that the terminal may determine that processing of the event fails when the profile provision server does not successfully accept the event according to settings of the terminal (for example, when the profile provision server does not respond or provides a notification of other error causes).

In operation 619, the terminal 250 may transmit a message that requests the second event to the second profile provision server 275. For example, the event request (Request Event) in operation 619 may use a terminal authentication request message (authenticate client request) including at least one of the identifier (eUICC ID or EID) of the eUICC within the terminal 250 and the second event identifier (MatchingID2) received in operation 607.

In operation 621, the terminal 250 and the second profile provision server 275 may perform an RSP operation (profile installation, remote management, or RSP operation (Profile Download or RPM)) corresponding to the second event identifier (MatchingID2). For example, operation 621 may further include one or more message exchanges between the terminal 250 and the second profile provision server 275, and the first message that the second profile provision server 275 sends in reply to the terminal 250 may be a terminal authentication response message (authenticate client response).

After operation 621, the profile provision server 275 does not reply with the error cause of "event identifier refused (MatchingID Refused)" unlike operation 617, so that the terminal 250 may not add the second event to the event-processing exception list.

Since the second event has been completely processed, the second profile provision server 275 may send a request to delete the second event (Delete Event2) to the subscription relay server 260 in operation 623. For example, operation 623 may include an operation in which the second profile provision server 275 transmits an event deletion request message (Delete event request) including at least one of the identifier (eUICC or EID) of the eUICC within the terminal 250 and the second event identifier (MatchingID2) to the subscription relay server 260 and an operation in which the subscription relay server 260 replies with an event deletion response message (delete event response) in order to notify the second profile provision server 275 of the event deletion result.

In operation 625, the terminal 250 may transmit a message that requests an event to the subscription relay server 260. For example, the event request (Request Event) in operation 625 may use a terminal authentication request message (authenticate client request) including the identifier (eUICC ID or EID) of the eUICC within the terminal 250.

In operation 627, the subscription relay server 260 may reply with an event list to the terminal 250 Event1=(SM-DP+ Address, MatchingID1)). For example, the event list may include a list of events registered in the eUICC within the terminal 250 up to that point in time. Further, the event list may include information on events.

For example, the second event is deleted according to operation 623, but the first event is left in the subscription relay server 260, so the subscription relay server 260 may reply with the event list including information related to the first event. Further, the information related to the first event included in the event list may include at least one of the addresses of the first profile provision server 270 and the first event identifier (MatchingID1). In addition, the reply with the event list of operation 627 may use a terminal authentication response message (authenticate client response).

In operation 629, the terminal 250 may compare the event list (Check Exception List) received from the subscription relay server 260 in operation 627 with the event-processing exception list. For example, since the first event described in operation 617 is stored in the event-processing exception list, the terminal 250 may ignore the first event (ignore Event1), which does not need to be processed, without processing.

Although not illustrated in FIG. 6, the terminal 250 may delete some of the event-processing exception list thereafter. For example, an event after a predetermined amount of time from the time point at which the event is written in the event-processing exception list may be deleted from the event-processing exception list, and thus storage space can be secured. In another example, when the event-processing exception list is full, and thus a new event cannot be added thereto, the terminal 250 may delete the oldest event from the event-processing exception list and add the new event.

The terminal, according to various embodiments, may separately manage the list of events that are expected to fail in processing thereof through the event-processing exception list and ignore events that does not need to be processed in the event list with which the subscription relay server replies, so as to reduce resource consumption for unnecessary network connection between the terminal and the profile provision server and data calculations.

Figure 7:
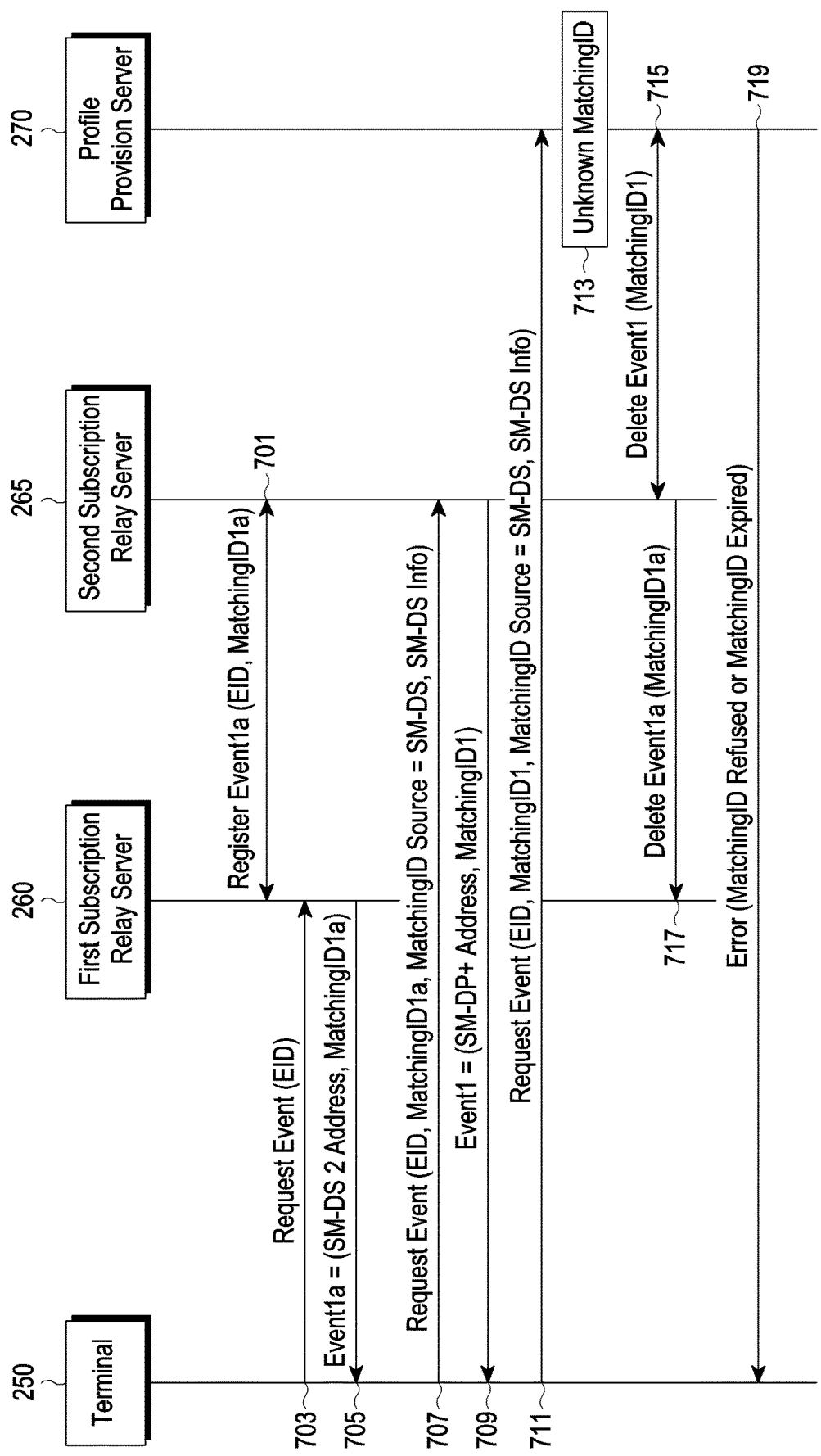
FIG. 7 illustrates a procedure in which the terminal additionally transmits information on an event identifier and information on the subscription relay server to the profile provision server according to various embodiments.

FIG. 7 illustrates a procedure of additionally transmitting information on the event identifier and information on the subscription relay server when the terminal sends a request for the event to the profile provision server according to various embodiments.

As illustrated in FIG. 7, although the profile provision server 270 has not registered the first event in the second subscription relay server 265 due to causes of an operation error, the second subscription relay server 265 may re-register the first event in the first subscription relay server 260 in operation 701. For example, operation 701 of re-registering the first event (Register Event1a) may include an operation in which the second subscription relay server 265 transmits an event registration request message (Register Event Request) including at least one of a modulated first event identifier (MatchingID1a), an identifier of an eUICC (eUICC ID or EID) within the terminal 250, an address of the second subscription relay server 265 (SM-DS2 Address), and a forwarding indicator set as "false" to the first subscription relay server 260 and an operation in which the first subscription relay server 260 replies with an event registration response message (Register Event Response) in order to notify the second subscription relay server 265 of the result of the event registration. For example, the modulated first event identifier (MatchingID1a) may be the same as the first event identifier (matching ID1).

In operation 703, the terminal 250 may transmit a message that requests an event to the first subscription relay server 260. For example, the event request (Register Event) in operation 703 may use a terminal authentication request message (Authenticate Client Request) including the identifier (eUICC ID or EID) of the eUICC within the terminal 250.

In operation 705, the first subscription relay server 260 may reply with an event list to the terminal 250 (Event1a= (SM-DS2 Address, MatchingID1a)). For example, the event list may include a list of events registered in the eUICC within the terminal 250 up to that point in time. Further, the event list may include information on events.

In FIG. 7, an example of replying with information on the re-registered first event in operation 701 will be described. For example, the information on the re-registered first event included in the event list may include at least one of the address of the second subscription relay server 265 and the modulated first event identifier (MatchingID1a). In addition, the reply with the event list of operation 705 may use a terminal authentication response message (Authenticate Client Response).

In operation 707, the terminal 250 may transmit a message that requests the modulated first event to the second subscription relay server 265. For example, the event request (Request Event) of operation 707 may use a terminal authentication request message (Authenticate Client Request) including at least one of the identifier of the eUICC (eUICC ID or EID) within the terminal 250, the modulated first event identifier (MatchingID1a) received in operation 705, the path through which the event identifier of the modulated first event is acquired (MatchingID Source), and information on the subscription relay server (SM-DS Info) that replies with information on the modulated first event.

For example, among the factors additionally added to the terminal authentication request message, the path through which the event identifier is acquired (MatchingID Source) may be expressed by one of a character string, a number string, and a bitmap, but the expressed path is not limited to the following list.

Empty string, emptyString, or none.
Activation code or activationCode
Command Code or commandCode
SM-DS or smds
Undefined or undefined.

For example, when the list is directly expressed by the character string in the present embodiment, the path through which the event identifier is acquired may be indicated by the "subscription relay server (SM-DS)". In another example, when the list corresponds to numbers 1, 2, 3, 4, and 5 in the present embodiment, the path through which the event identifier is acquired may be indicated by "4". In yet another example, when the list corresponds to a first bit, a second bit, a third bit, a fourth bit, and a fifth bit in the present embodiment, the path through which the event identifier is acquired may be indicated by a bitmap of "00010".

Among the factors additionally included in the terminal authentication request message, the subscription relay server information (SM-DS Info) may include at least one of the information related to the subscription relay server in the following list, and may further include other pieces of information related to the subscription relay server as well as the following list.

Fully Qualified Domain Name (FQDN) of the subscription relay server
Unique Object ID or OID of the subscription relay server
IP address of the subscription relay server
URL for loading a particular function of the subscription relay server
Version information of the subscription relay server
Certificate information (signature algorithm) of the subscription relay server
Certificate issuer information of the subscription relay server
Time point (timestamp) at which an event is registered in the subscription relay server
Time point (timestamp) at which the subscription relay server transmits an event to the terminal In operation 709, the second subscription relay server 265 may reply with an event list to the terminal 250. For example, the event list may include a list of events registered in the eUICC within the terminal 250 up to that point in time. Further, the event list may include information on events.

FIG. 7 illustrates an example of replying with the information on the first event (Event1=(SM-DP+ Address, MatchingID1)), which has not been registered in the second subscription relay server, as described in operation 701. For example, the information on the first event included in the event list may include at least one of the address of the profile provision server 270 and the first event identifier (MatchingID1). In addition, the reply with the event list of operation 709 may use a terminal authentication response message (Authenticate Client Response).

In operation 711, the terminal 250 may transmit a message that requests the first event to the profile provision server 270. For example, the event request (Request Event) of operation 711 may use a terminal authentication request message (Authenticate Client Request) including at least one of the identifier of the eUICC (eUICC ID or EID) within the terminal 250, the first event identifier (MatchingID1) received in operation 709, the path through which the event identifier of the first event is acquired (MatchingID Source), and information on the subscription relay server (SM-DS Info) that replies with the first event. For example, when the path through which the event identifier is acquired (MatchingID Source) or the subscription relay server information (SM-DS Info) is included, only information on the event received most recently (for example, only information on the first event and the second subscription relay server 265 in which the first event is registered) may be provided, or information on all events used until the most recently received event is received (for example, information on the first event, the second subscription relay server 265 in which the first event is registered, the re-registered first event, and the first subscription relay server 260 in which the first event is re-registered) may be provided. For a description of a method of expressing the path through which the event identifier is acquired and the subscription relay server information, reference to the description of operation 707 is to be made.

In operation 713, the profile provision server 270 may determine that the first event identifier (MatchingID1) received in operation 711 is an event identifier that cannot be recognized (Unknown MatchingID) and thus cannot be processed.

In operation 715, the profile provision server 270 may identify that the first event identifier (MatchingID1), which cannot be recognized, is currently registered in the second subscription relay server 265 on the basis of the path through which the event identifier is acquired and the subscription relay server information is received in operation 711, unlike operation 507 of FIG. 5. Accordingly, the profile provision server 270 may send a request to delete the first event (Delete Event1) to the second subscription relay server 265 in operation 715.

For example, operation 715 may include an operation in which the profile provision server 270 transmits an event deletion request message (Delete event request), including at least one of the identifier (eUICC or EID) of the eUICC within the terminal 250 and the first event identifier (MatchingID1), to the second subscription relay server 265 and an operation in which the second subscription relay server 265 replies with an event deletion response message (Delete Event Response) in order to notify the profile provision server 270 of the event deletion result.

Since the first event has been completely processed, the second subscription relay server 265 may send a request to delete the re-registered first event (Delete Event1a) to the first subscription relay server 260 in operation 717. For example, operation 717 may include an operation in which the second subscription relay server 265 transmits an event deletion request message (Delete Event Request) including at least one of the identifier (eUICC or EID) of the eUICC within the terminal 250 and a modulated first event identifier (MatchingID1a) to the first subscription relay server 260 and an operation in which the first subscription relay server 260 replies with an event deletion response message (Delete Event Request) in order to notify the second subscription relay server 265 of the event deletion result.

In operation 719, the profile provision server 270 may notify the terminal 250 of a message indicating that the first event identifier received in operation 711 cannot be recognized or is deleted. For example, the message (Error) of operation 719 may be a terminal authentication response message (authenticate client response) including the error cause. Further, the error cause included in the message of operation 719 may be a character string or a number string which is "event identifier refused (MatchingID Refused)" indicating the case in which the event identifier cannot be recognized or "event expired (MatchingID Expired)" indicating the case in which the event identifier is deleted.

When accessing the profile provision server, the terminal, according to various embodiments, may additionally provide information on the subscription relay server that redirects the terminal to the corresponding profile provision server to allow the profile provision server to directly delete events left in the subscription relay server with respect to the events that do not need to be processed, so as to reduce resource consumption for unnecessary network connection between the terminal and the subscription relay server and data calculations.

Figure 8:
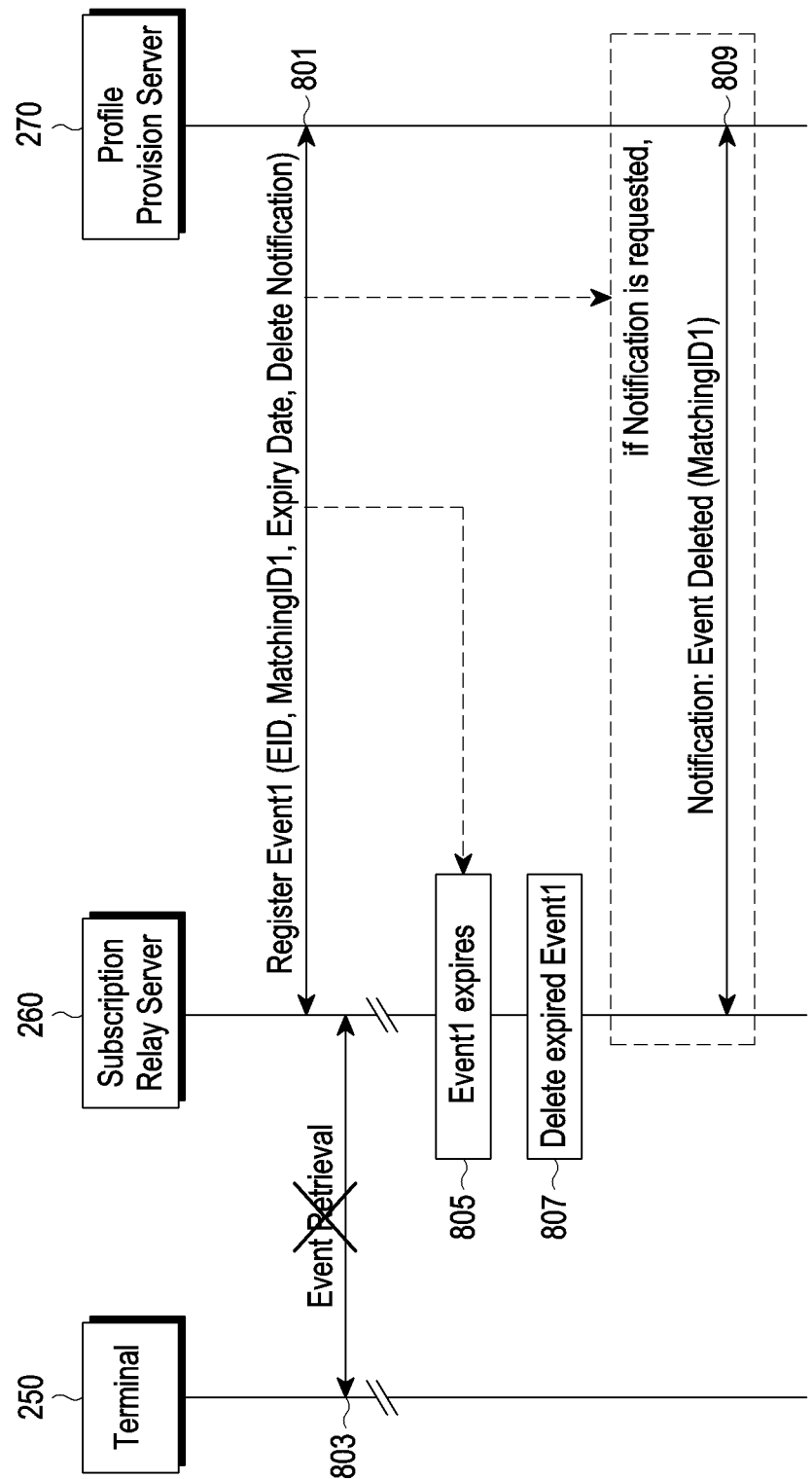
FIG. 8 illustrates a procedure in which the profile provision server notifies the subscription relay server of an event expiration time point according to various embodiments.

FIG. 8 illustrates a procedure in which the profile provision server notifies the subscription relay server of an expiration time point of the event according to various embodiments.

FIG. 8 illustrates a procedure in which the profile provision server provides a notification of the expiration time point of the event when registering the event in the subscription relay server according to various embodiments.

As illustrated in FIG. 8, the profile provision server 270 may generate a first event and register the generated first event in the subscription relay server 260 in operation 801. For example, operation 801 of registering the event (Request Event1) may include an operation in which the profile provision server 270 transmits an event registration request message (Register Event Request) including at least one of a first event identifier (MatchingID1), an identifier of an eUICC (eUICC ID or EID) within the terminal 250, an address of the profile provision server 270 (SM-DP+ Address), a forwarding indicator set as "false", and additionally an event expiration time point (Expiry Date) and a deletion notification indicator (Delete Notification Indicator) to the subscription relay server 260 and an operation in which the subscription relay server 260 replies with an event registration response message (Register Event Response) in order to notify the profile provision server 270 of the result of the event registration.

For example, among the factors additionally included in the event registration request message, the event expiration time point (Expiry Date) may be used when the subscription relay server 260 makes a request to delete the corresponding event when the event registered in the subscription relay server 260 is left in the subscription relay server 260 without being requested or replied to by the terminal 250 for a predetermined time, and it may be indicated by one of the following methods.

A particular point in time (Expiry Date) at which an event should be deleted

The time period (Lifetime) during which an event may be registered in the subscription relay server Among the factors additionally included in the event registration request message, the deletion notification indicator (Delete Notification Indicator) may be used to make a request for notifying the profile provision server 270 of the deletion of the corresponding event when the subscription relay server 260 deletes the particular event as indicated at the event expiration time point (Expiry Date).

In operation 803, the subscription relay server 260 waits for the event request from the terminal 250. However, due to causes such as a blockage of the power supply of the terminal, internal operation errors, or network connection loss, no event request is received from the terminal 250, and thus the first event may become the remaining event in the subscription relay server 260. Alternatively, although the terminal 250 receives the corresponding event from the subscription relay server 260, the terminal 250 has not processed the corresponding event (that is, the terminal 250 does not access the profile provision server 270) due to causes such as a blockage of the power supply of the terminal, internal operation errors, or network connection loss after receiving the event, so that the first event, which the profile provision server 270 has not deleted, may become the remaining event in the subscription relay server 260.

In operation 805, the subscription relay server 260 may determine that the first event is expired (Event1 expires) according to the content of the event expiration time point included in the event registration request message of operation 801.

In operation 807, the subscription relay server 260 may delete the first event expired (Delete expired Event1) in operation 805.

In operation 809, with respect to the first event deleted in operation 807, the subscription relay server 260 may notify the profile provision server 270 of the deletion of the corresponding first event (Notification: Event Deleted (MatchingID1)) according to the content of the deletion notification indicator included in the event registration request message of operation 801.

The profile provision server, according to various embodiments, may notify the subscription relay server of each event expiration time point and allow the subscription relay server to automatically delete the event left in the subscription relay server although the terminal has not acquired or has not processed the event for some reason, and thus the subscription relay server may reduce resource consumption for storing the event.

The embodiments of FIGS. 6 to 8 are not mutually exclusive, and it should be noted that two or more embodiments such as embodiments of FIGS. 9A and 9B described below can be applied together. When the embodiments of FIGS. 6 to 8 are applied to the server connection structure of the system in which one or more profile provision server and one or more subscription relay servers exist, as described in FIGS. 3 to 4, the embodiments of FIGS. 6 to 8 should be expanded according to the message exchange procedure between the terminal, the subscription relay server, and the profile provision server illustrated in FIGS. 3 to 4.

Figure 9A:
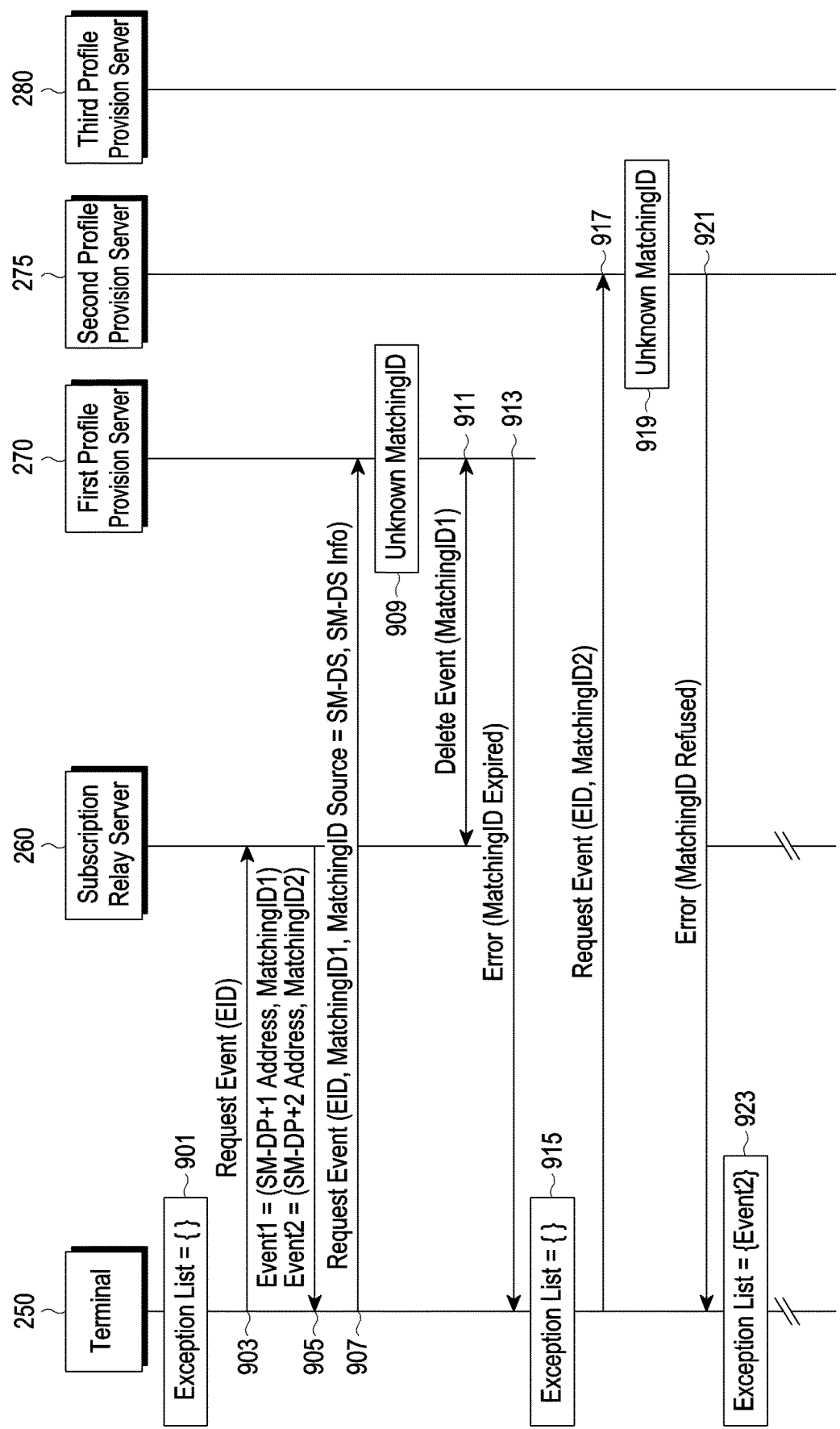
FIGS. 9A and 9B illustrate a procedure in which the terminal, the subscription relay server, and the profile provision server operate according to various embodiments.
Figure 9B:
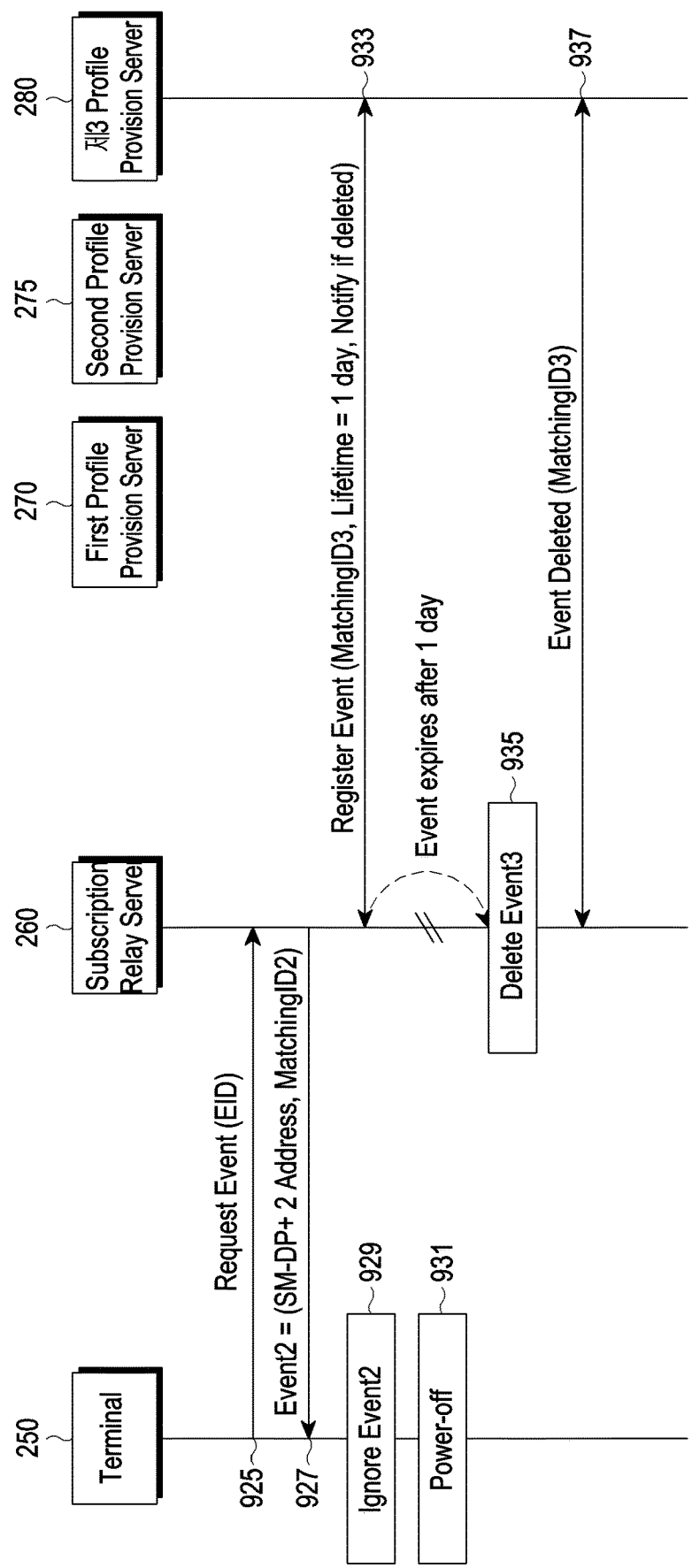

FIGS. 9A and 9B illustrate a procedure in which the terminal, the subscription relay server, and the profile provision server operate according to various embodiments.

FIGS. 9A and 9B illustrate a procedure in which the terminal, according to various embodiments, manages an event-processing exception list and additionally transmits information of an event identifier and information on the subscription relay server when making a request for the event to the profile provision server, and the profile provision server provides a notification of an event expiration time point when registering the event in the subscription relay server.

As illustrated in FIGS. 9A and 9B, the first profile provision server 270, according to various embodiments, may be a profile provision server having a function of deleting an event identifier (MatchingID), one which is determined not to be valid, from the subscription relay server 260.

For example, as a method of notifying the terminal 250 of whether the function is implemented, the first profile provision server 270 may provide information on the version of the profile provision server during a mutual authentication procedure (Common Mutual Authentication) between the terminal and the profile provision server. For example, the mutual authentication procedure may be a series of message exchange procedures including a terminal authentication request message (Authenticate Client Request) that the terminal transmits to the profile provision server. Further, for example, the information on the version of the first profile provision server 270 may be expressed as "SVN=3.0.0."

As illustrated in FIGS. 9A and 9B, the second profile provision server 275, according to various embodiments, may be a profile provision server that does not have a function of deleting an event identifier (MatchingID), one which is determined not to be valid, from the subscription relay server 260. For example, as a method of notifying the terminal 250 of whether the function is not implemented, the second profile provision server 275 may provide information on the version of the profile provision server during a mutual authentication procedure (Common Mutual Authentication) between the terminal and the profile provision server. For example, the mutual authentication procedure may be a series of message exchange procedures including a terminal authentication request message (Authenticate Client Request) that the terminal transmits to the profile provision server. Further, for example, the information on the version of the second profile provision server 275 may be expressed as "SVN=2.0.0".

As illustrated in FIGS. 9A and 9B, a third profile provision server 280, according to various embodiments, may be a profile provision server having an additional function of providing notification of the event expiration time point when registering the event in the subscription relay server 260.

For example, as a method of notifying the subscription relay server 260 of whether the function is implemented, the third profile provision server 280 may provide information on the version of the profile provision server during an HTTPS server mutual authentication procedure (HTTPS Server Mutual Authentication) between the profile provision server and the subscription relay server.

Further, for example, the information on the version of the third profile provision server 280 may be expressed as "SVN=1.0.0".

In operation 901, the terminal 250 may make an event-processing exception list. For a detailed description of operation 901, reference is to be made to the description of operation 601 of FIG. 6. For example, the event-processing exception list first made in operation 901 may not include any event.

In operation 903, the terminal 250 may transmit a message that requests an event to the subscription relay server 260. For example, the event request (Request Event) in operation 903 may use a terminal authentication request message (Authenticate Client Request) including the identifier of the eUICC (eUICC ID or EID) within the terminal 250.

In operation 905, the subscription relay server 260 may reply with an event list to the terminal 250. For example, the event list may include a list of events registered in the eUICC within the terminal 250 up to that point in time. Further, the event list may include information on events.

FIGS. 9A and 9B illustrate an example of replying with information related to the first event and information on the second event left in the subscription relay server 260 due to the cause described in operation 507 of FIG. 5. For example, the information related to the first event (Event1=(SM-DP+1 Address, MatchingID1)) included in the event list may include at least one of an address of the first profile provision server 270 (SM-DP+1 Address) and a first event identifier (MatchingID1), and the information related to the second event (Event2=(SM-DP+2 Address, MatchingID2)) included in the event list may include at least one of an address of the second profile provision server 275 (SM-DP+2 Address) and a second event identifier (MatchingID2). For example, the reply with the event list of operation 905 may use a terminal authentication response message (Authenticate Client Response).

Further, the terminal 250 receiving the event list of operation 905 may compare the event list with the event-processing exception list. In the present embodiment, an example in which the event-processing exception list is empty and thus all events are processed will be described. Thereafter, the terminal may attempt to process the first event and the second event in operation 907 and operation 917.

In operation 907, the terminal 250 may transmit a message that requests the first event to the first profile provision server 270. For example, through the mutual authentication procedure (Common Mutual Authentication), the terminal 250 may identify that a function by which the first profile provision server 270 deletes an invalid event identifier from the subscription relay server 260 is implemented.

For example, the event request (Request Event) of operation 907 may use a terminal authentication request message (Authenticate Client Request) including at least one of the identifier of the eUICC (eUICC ID or EID) within the terminal 250, the first event identifier (MatchingID1) received in operation 905, the path through which the event identifier of the first event is acquired (MatchingID Source), and information on the subscription relay server (SM-DS Info) which replies with the information related to the first event. For example, for a description of a method of expressing the path through which the event identifier is acquired (MatchingID Source) and the subscription relay server information, reference is to be made to the description of operation 707 of FIG. 7.

In operation 909, the first profile provision server 270 may determine that the first event identifier (MatchingID1) received in operation 907 is an event identifier that cannot be recognized (Unknown MatchingID) and thus cannot be processed. For example, for an example of the case in which the event identifier that the first profile provision server 270 cannot recognize may exist in the subscription relay server 260, reference is to be made to the description of operation 507 of FIG. 5.

In operation 911, the first profile provision server 270 may identify that the first event identifier (MatchingID1), which cannot be recognized, is currently registered in the subscription relay server 260 on the basis of the path through which the event identifier is acquired and the subscription relay server information is received in operation 907.

Also, in operation 911, the first profile provision server 270 may send a request to delete the first event (Delete Event1) to the subscription relay server 260. For example, operation 911 may include an operation in which the first profile provision server 270 transmits an event deletion request message (Delete Event Request) including at least one of the identifier (eUICC or EID) of the eUICC within the terminal 250 and the first event identifier (MatchingID1) to the subscription relay server 260 and an operation in which the subscription relay server 260 replies with an event deletion response message (Delete Event Response) in order to notify the first profile provision server 270 of the event deletion result.

In operation 913, the first profile provision server 270 may send the terminal 250 a message (Error) indicating that the first event identifier received in operation 907 cannot be recognized or has been deleted.

For example, the message of operation 913 may be a terminal authentication response message (Authenticate Client Response) including the error cause. Further, the error cause may be a character string or a number string which is "event identifier refused (MatchingID Refused)", indicating the case in which the event identifier cannot be recognized, or "event expired (MatchingID Expired)", indicating the case in which the event identifier is deleted. The embodiment of FIGS. 9A and 9B illustrates the case in which the error cause included in the message of operation 913 is the character string indicating "event expired (MatchingID Expired)", which is the case in which the event identifier is deleted Since the first profile provision server 270 provides a notification of the error cause of "event expired (MatchingID Expired)" on the basis of the processing result of the first event in operation 913, the terminal 250 may not add the first event to the event-processing exception list (Exception List={ }) in operation 915.

In operation 917, the terminal 250 may transmit a message that requests the second event (Request Event) to the second profile provision server 275. For example, through the mutual authentication procedure (Common Mutual Authentication), the terminal 250 may identify that the function by which the second profile provision server 275 deletes the event identifier, which is not valid, from the subscription relay server 260 is not implemented.

For example, the event request in operation 917 may use a terminal authentication request message (Authenticate Client Request) including at least one of the identifier of the eUICC (eUICC ID or EID) within the terminal 250 and the second event identifier (MatchingID2) received in operation 905.

In operation 919, the second profile provision server 275 may determine that the second event identifier (MatchingID2) received in operation 917 is an event identifier that cannot be recognized (Unknown MatchingID) and thus cannot be processed. For example, for an example of the case in which an event identifier that the second profile provision server 275 cannot recognize may exist in the subscription relay server 260, reference is to be made to the description of operation 507 of FIG. 5.

In operation 921, the second profile provision server 275 may send the terminal 250 a message (Error) indicating that the second event identifier received in operation 917 cannot be recognized or has been deleted. For example, the message of operation 921 may be a terminal authentication response message (Authenticate Client Response) including the error cause. Further, for example, the error cause may be a character string or a number string which is "event identifier refused (MatchingID Refused)", indicating the case in which the event identifier cannot be recognized, or "event expired (MatchingID Expired)", indicating the case in which the event identifier is deleted. The embodiment of FIGS. 9A and 9B illustrate the case in which the error cause included in the message of operation 921 is the character string indicating "event identifier refused (MatchingID Refused)", which is the case in which the event identifier cannot be recognized.

Since the second profile provision server 275 provides a notification of the error cause of "event identifier refused (MatchingID Refused)" on the basis of the processing result of the second event in operation 921, the terminal 250 may add the second event to the event-processing exception list (Exception List={Event2}) in operation 923.

In operation 925, the terminal 250 may transmit a message that requests an event to the subscription relay server 260. For example, the event request (Request Event) in operation 925 may use a terminal authentication request message (Authenticate Client Request) including the identifier (eUICC ID or EID) of the eUICC within the terminal 250.

In operation 927, the subscription relay server 260 may reply with an event list to the terminal 250 (Event2=(SM-DP+2 Address, MatchingID2)).

For example, the event list may include a list of events registered in the eUICC within the terminal 250 up to that point in time. Further, the event list may include information on events.

For example, since the first event has been deleted in operation 911 but the second event is left in the subscription relay server 260, the subscription relay server 260 may reply with the event list including information related to the second event. Further, the information related to the second event included in the event list may include at least one of the address of the second profile provision server 275 (SM-DP+ Address) and the second event identifier (MatchingID2). The reply with the event list of operation 927 may use a terminal authentication response message (Authenticate Client Response).

In operation 929, the terminal 250 may compare the event list received from the subscription relay server 260 in operation 927 with the event-processing exception list. For example, since the second event described in operation 923 is stored in the event-processing exception list, the terminal 250 may ignore the second event (Ignore Event2), which does not need to be processed, without processing.

In operation 931, the terminal 250 may end the operation and not access the subscription relay server 260 anymore.

Alternatively, the terminal 250 may receive information on the third event from the subscription relay server 260 but not access the third profile provision server 280 to process the third event in operation 931. For example, the example of the operation of the terminal 250 may correspond to the case in which power is interrupted, the network connection is lost, or the system is terminated due to an error inside the terminal. The present embodiment illustrates an example of the case in which power is interrupted, and thus the terminal 250 no longer accesses the subscription relay server 260.

In operation 933, the third profile provision server 280 may generate a third event and register the generated third event in the subscription relay server 260. For example, operation 933 of registering the event (Register Event) may include an operation in which the third profile provision server 280 transmits an event registration request message (Register Event Request) including at least one of a third event identifier (MatchingID3), an identifier of an eUICC (eUICC ID or EID) within the terminal 250, an address of the third profile provision server 280 (SM-DP+3 Address), a forwarding indicator set as "false", and additionally an event expiration time point (Expiry Date) and a deletion notification indicator (Delete Notification Indicator) to the subscription relay server 260 and an operation in which the subscription relay server 260 replies with an event registration response message (Register Event Response) in order to notify the third profile provision server 280 of the result of the event registration.

For example, FIGS. 9A and 9B illustrate, as an example of the event expiration time point, an example in which a time period during which the event can be registered in the subscription relay server is set as "1" and a request for providing notification of the deletion of the third event is made to the third profile provision server when the third event is deleted.

Since the terminal 250 does not request the third event for one day, as set by the third profile provision server 280 in operation 933, the subscription relay server 260 may determine that the third event should be deleted and delete the third event (Delete Event3) in operation 935.

In operation 937, the subscription relay server 260 may notify the third profile provision server 280 of the deletion of the third event (Event Deleted(MatchingID3)).

Figure 10:
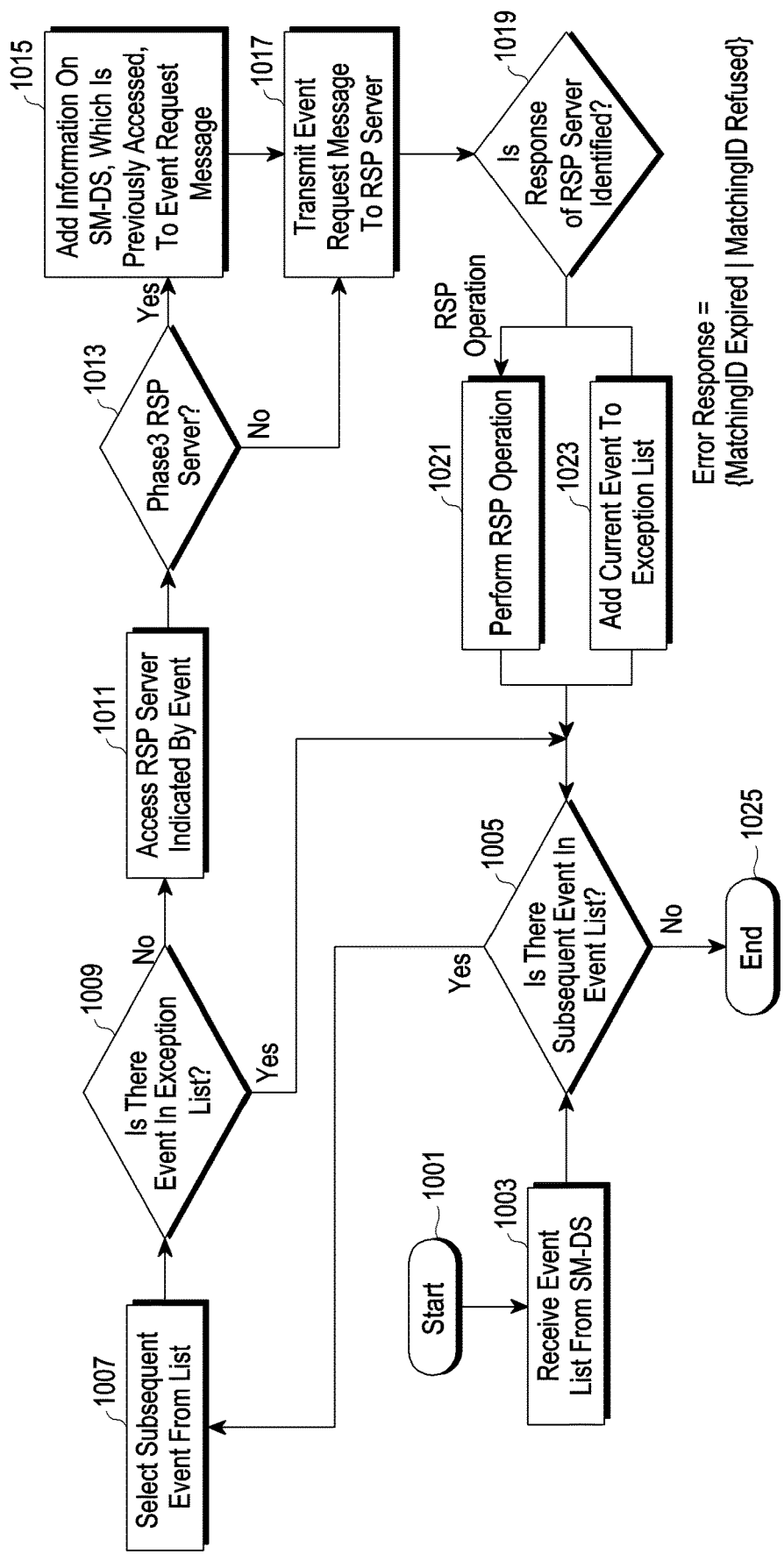
FIG. 10 illustrates an example of the operation performed by the terminal according to various embodiments.

FIG. 10 illustrates an example of the operation performed by the terminal according to various embodiments.

FIG. 10 is a flowchart illustrating a procedure in which the terminal makes and manages the event-processing exception list and additionally transmits information on the event identifier and information on the subscription relay server when requesting the event to the profile provision server according to various embodiments.

As illustrated in FIG. 10, the terminal may initiate the operation in operation 1001.

In operation 1003, the terminal may receive the event list from the subscription relay server.

In operation 1005, the terminal may determine whether there is a subsequent event in the event list. For example, when there is a subsequent event in the event list in operation 1005, the terminal may proceed to operation 1007. Further, when there is no subsequent event in the event list in operation 1005, the terminal may proceed to operation 1025.

In operation 1007, the terminal may select the subsequent event in the event list.

In operation 1009, the terminal may determine whether the event selected from the event list is included in the event-processing exception list. For example, when the event selected from the event list is included in the event-processing exception list in operation 1009, the terminal may proceed to operation 1005. When the event selected from the event list is not included in the event-processing exception list in operation 1009, the terminal may proceed to operation 1011.

The terminal, according to various embodiments, may selectively perform operation 1009. For example, when the terminal does not manage the event-processing exception list, the terminal may proceed to operation 1011.

In operation 1011, the terminal may access an RSP server indicated by a server address included in the event. As described with reference to FIG. 4, the RSP server may be another subscription relay server or a profile provision server.

In operation 1013, the terminal may determine whether the corresponding RSP server is "a profile provision server that can delete an invalid event from the subscription relay server".

For example, the determination reference may use information on the version of the RSP server and certification information.

When the RSP server is an RSP server that can delete an invalid event from the subscription relay server in operation 1013, the terminal may proceed to operation 1017. When the RSP server is not an RSP server that can delete an invalid event from the subscription relay server in operation 1013, the terminal may proceed to operation 1015.

The terminal, according to various embodiments, may selectively perform operation 1013. For example, when the terminal desires to transmit the path through which the event identifier is acquired and the subscription relay server information to the RSP server regardless of the function of the RSP server, the terminal may proceed to operation 1015. Further, when the terminal desires to not transmit the path through which the event identifier is acquired and the subscription relay server information to the RSP server regardless of the function of the RSP server, the terminal may proceed to operation 1017.

As described in operation 707 of FIG. 7, the terminal may prepare the path through which the event identifier is acquired (MatchingID Source) and the subscription relay server information (SM-DS Info) as information to be additionally transmitted when requesting the event to the RSP server in operation 1015.

In operation 1017, the terminal may send a request for the event to the RSP server. For example, the event request of operation 1017 may use a terminal authentication request message (Authenticate Client Request) including at least one of the identifier of the eUICC (eUICC ID or EID) within the terminal, the event identifier (MatchingID), the path through which the event identifier is acquired (MatchingID Source), and information on the subscription relay server (SM-DS Info) that replies with the event identifier. Operation 1017 corresponds to operation 1109 of FIG. 11.

In operation 1019, the terminal may identify the response of the RSP server to the event request of operation 1017. For example, when the response of the RSP server includes the RSP operation in operation 1019, the terminal may proceed to operation 1021. Further, when the response of the RSP server includes the error cause in operation 1019, the terminal may proceed to operation 1023.

In operation 1021, the terminal may receive the performance of the RSP operation corresponding to the RSP server and the event identifier. For example, a terminal authentication response message (Authenticate Client Response) may be used for the reception. Operation 1021 corresponds to operation 1113 of FIG. 11.

In operation 1023, the terminal may identify the error cause and add the event corresponding to the event identifier to the event-processing exception list. Operation 1023 corresponds to operation 1125 of FIG. 11.

The terminal, according to various embodiments, may selectively perform operation 1023. For example, when the terminal does not manage the event-processing exception list, the terminal may perform operation 1005. When the terminal adds only an event corresponding to a particular error cause among the error causes (for example, at least one of "event expired (MatchingID Expired)" and "event identifier refused (MatchingID Refused)") to the event-processing exception list, the terminal receiving other error causes may perform operation 1005.

In operation 1025, the terminal may end the operation and wait for the additional connection to the subscription relay server.

Figure 11:
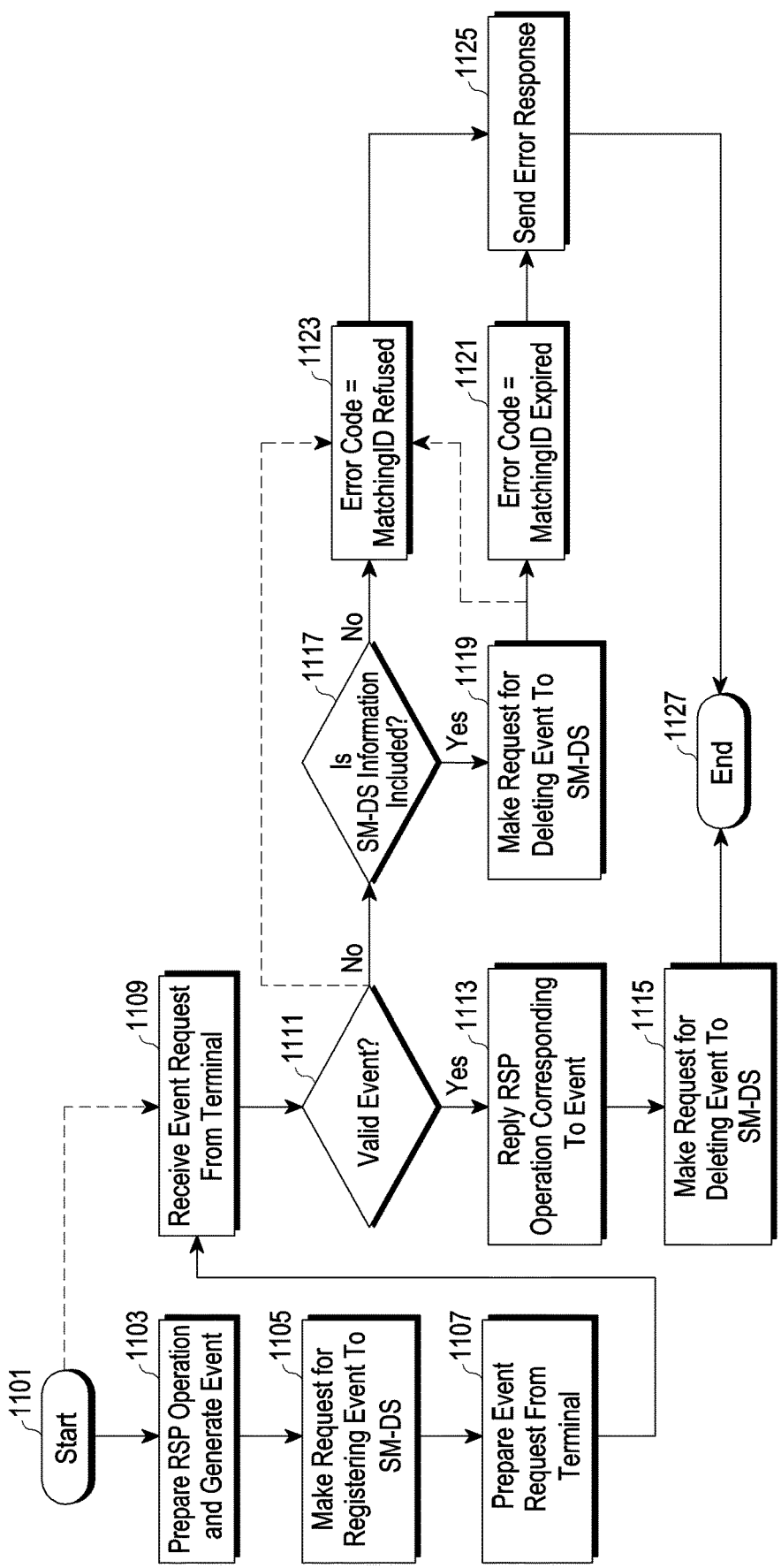
FIG. 11 illustrates an example of the operation performed by the profile provision server according to various embodiments.

FIG. 11 illustrates an example of the operation performed by the profile provision server according to various embodiments.

FIG. 11 is a flowchart illustrating a procedure in which the profile provision server (or the subscription relay server) additionally receives information on the event identifier and information on the subscription relay server from the terminal and deletes an event that cannot be recognized from the subscription relay server according to various embodiments.

As illustrated in FIG. 11, the profile provision server may initiate the operation in operation 1101.

Meanwhile, when receiving a request for an event from the terminal before the event is generated, the profile provision server may proceed to operation 1109.

In operation 1103, the profile provision server may prepare the RSP operation (Remote SIM Provisioning (RSP) Operation) and the event identifier corresponding thereto to generate the event.

In operation 1105, the profile provision server may register the event generated in operation 1103 in the subscription relay server. For example, the event registration request of operation 1105 may use an event registration request message (Register Event Request) including at least one of the event identifier (MatchingID), the identifier of the eUICC (eUICC ID or EID) within the terminal, the address of the profile provision server, the forwarding indicator, the event expiration time point (Expiry Date), and the deletion notification indicator (Delete Notification Indicator). Operation 1105 corresponds to operation 1203 of FIG. 12.

In operation 1107, the profile provision server may wait for a request for the event generated in operation 1103 from the terminal.

In operation 1109, the profile provision server may receive the event request from the terminal. For example, the event request of operation 1109 may use a terminal authentication request message (Authenticate Client Request) including at least one of the identifier of the eUICC (eUICC ID or EID) within the terminal, the event identifier (MatchingID), the path through which the event identifier is acquired (MatchingID Source), and information on the subscription relay server (SM-DS Info) that replies with the event identifier. Operation 1109 corresponds to operation 1017 of FIG. 10.

In operation 1111, the profile provision server may determine whether the event identifier (MatchingID) received from the terminal is valid. For example, when the corresponding event identifier is valid in operation 1111, the profile provision server may proceed to operation 1113. When the corresponding event identifier is not valid and the profile provision server is "an RSP server that can delete the invalid event from the subscription relay server" in operation 1111, the profile provision server may proceed to operation 1117. When the corresponding event identifier is not valid and the profile provision server is not "an RSP server which can delete the invalid event from the subscription relay server" in operation 1111, the profile provision server may proceed to operation 1123.

In operation 1113, the profile provision server may reply with the performance of the RSP operation corresponding to the event identifier to the terminal. For example, a terminal authentication response message (Authenticate Client Response) may be used for the response. Operation 1113 corresponds to operation 1021 of FIG. 10.

In operation 1115, the profile provision server may send a request to delete the event corresponding to the RSP operation to the subscription relay server.

In operation 1117, the profile provision server may determine whether the subscription relay server information (SM-DS Info) is included in the event request received from the terminal. For example, when the subscription relay server information is included in operation 1117, the profile provision server may proceed to operation 1119. When the subscription relay server information is not included in operation 1117, the profile provision server may proceed to operation 1123.

In operation 1119, the profile provision server may delete the invalid event identifier from the corresponding subscription relay server on the basis of the subscription relay server information received from the terminal.

In operation 1121, the profile provision server may prepare the error cause of "event expired (MatchingID Expired)" in response to the event request of the terminal.

In operation 1123, the profile provision server may prepare the error cause of "event identifier refused (MatchingID Refused)" in response to the event request of the terminal.

The profile provision server, according to various embodiments, may selectively perform operations 1121 to 1123. For example, when the profile provision server does not distinguish the error causes, the profile provision server may prepare the error cause of "event identifier refused (Matching ID Refused)" regardless of whether the event is deleted.

In operation 1125, the profile provision server may reply with the response to the event request of the terminal, including the error cause prepared in operation 1121 or 1123. For example, a terminal authentication response message (Authenticate Client Response) may be used for the response. Operation 1125 corresponds to operation 1023 of FIG. 10.

In operation 1127, the profile provision server may end the operation and wait for additional event generation or the event request of the terminal.

Figure 12:
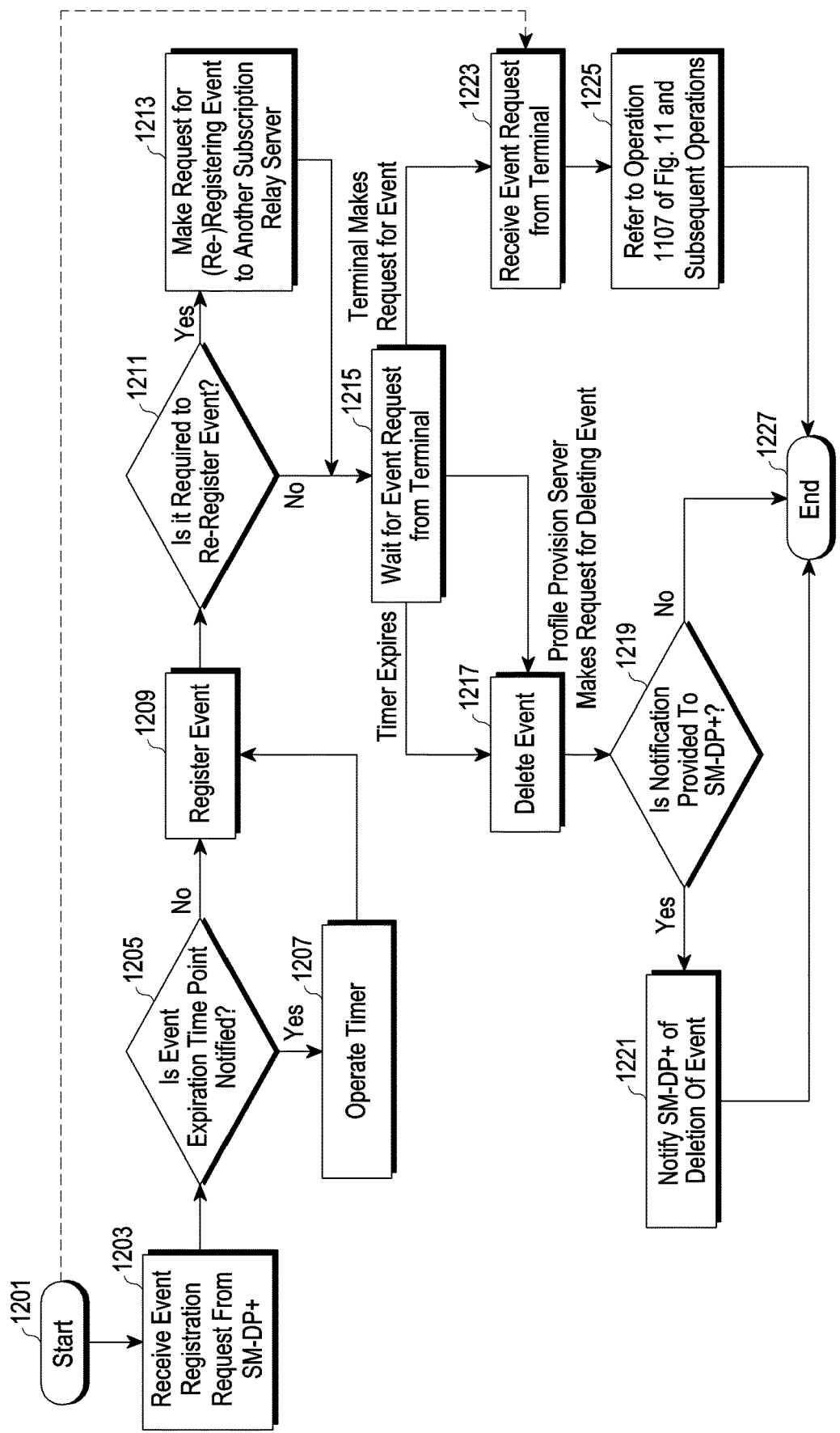
FIG. 12 illustrates an example of the operation performed by the subscription relay server according to various embodiments.

FIG. 12 illustrates an example of the operation performed by the subscription relay server according to various embodiments.

FIG. 12 is a flowchart illustrating the procedure in which the subscription relay server processes the event in response to the event registration request from the profile provision server and the event request from the terminal according to various embodiments.

As illustrated in FIG. 12, the subscription relay server may initiate the operation in operation 1201. Meanwhile, when receiving the event request from the terminal before the event registration, the subscription relay server may proceed to operation 1223.

In operation 1203, the subscription relay server may receive an event registration request from the profile provision server.

For example, the event registration request of operation 1203 may use an event registration request message (Register Event Request) including at least one of the event identifier (MatchingID), the identifier of the eUICC (eUICC ID or EID) within the terminal, the address of the profile provision server, the forwarding indicator, the event expiration time point (Expiry Date), and the deletion notification indicator (Delete Notification Indicator). The event registration request of operation 1203 may be received not only from the profile provision server, but also from another subscription relay server as described in FIG. 4. In this case, it should be noted that the operation of the profile provision server described below in FIG. 12 may be performed by another subscription relay server.

In operation 1205, the subscription relay server may determine whether the profile provision server provides a notification of an event expiration time point. For example, when the profile provision server provides a notification of the event expiration time point in operation 1205, the subscription relay server may proceed to operation 1207. Further, when the profile provision server does not provide a notification of the event expiration time point in operation 1205, the subscription relay server may proceed to operation 1209.

In operation 1207, the subscription relay server may operate a timer at the event expiration time point indicated by the profile provision server.

In operation 1209, the subscription relay server may register the event requested by the profile provision server.

In operation 1211, the subscription relay server may determine whether the profile provision server requests the re-registering the event. For example, when the profile provision server requests the re-registering the event in operation 1211, the subscription relay server may proceed to operation 1213. Further, when the profile provision server does not request the re-registering the event in operation 1211, the subscription relay server may proceed to operation 1215.

In operation 1213, the subscription relay server may request (re-) registering the event to another subscription relay server. For example, the event registration request of operation 1213 may use an event registration request message (Register Event Request) including at least one of the event identifier (MatchingID), the identifier of the eUICC (eUICC ID or EID) within the terminal, the address of the profile provision server, the forwarding indicator, the event expiration time point (Expiry Date), and the deletion notification indicator (Delete Notification Indicator).

In operation 1215, the subscription relay server may wait for the request for the event registered in operation 1209 from the terminal. For example, when the timer set in operation 1207 expires or when the profile provision server makes a request to delete the event registered in operation 1209, the subscription relay server may proceed to operation 1217.

For example, when the terminal requests the event, the subscription relay server may proceed to operation 1223. When the event is not deleted, the subscription relay server may continuously wait for the event request from the terminal in operation 1215.

In operation 1217, the subscription relay server may delete the event registered in operation 1209.

In operation 1219, the subscription relay server may determine whether the profile provision server makes a request for providing a notification of deletion of the event. For example, when the profile provision server makes a request for providing a notification of deletion of the event in operation 1219, the subscription relay server may proceed to operation 1221. When the profile provision server does not make a request for providing a notification of deletion of the event in operation 1219, the subscription relay server may proceed to operation 1223.

In operation 1221, the subscription relay server may notify the profile provision server of deletion of the event registered in operation 1209.

In operation 1223, the subscription relay server may receive the event request from the terminal. For example, the event request of operation 1223 may use a terminal authentication request message (Authenticate Client Request) including at least one of the identifier of the eUICC (eUICC ID or EID) within the terminal, the event identifier (MatchingID), the path through which the event identifier is acquired (MatchingID Source), and information on the subscription relay server (SM-DS Info) that replies with the event identifier. Operation 1223 is performed in the same manner as operation 1111 of FIG. 11.

Operation 1225 is performed in the same manner as operation 1113 of FIG. 11 and operations subsequent thereto. Accordingly, for a description of operation 1225, reference is to be made to the description of operation 1113 of FIG. 11 and operations subsequent thereto.

In operation 1227, the subscription relay server may end the operation and wait for the additional event registration from the profile provision server and the event request from the terminal.

Figure 13:
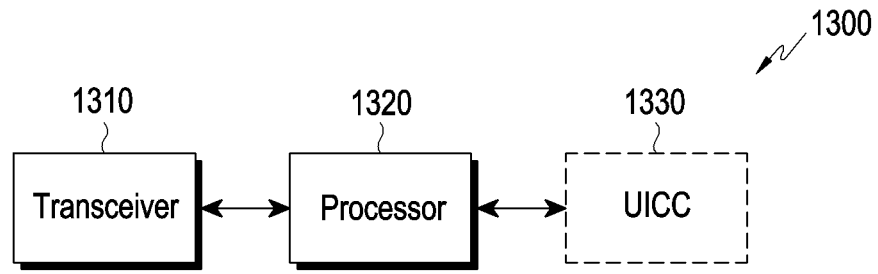
FIG. 13 is a block diagram illustrating elements of the terminal according to various embodiments.

Meanwhile, FIG. 13 illustrates elements of the terminal 250 according to an embodiment of the present disclosure.

As illustrated in FIG. 13, the terminal 250 may include a transceiver 1310 and at least one processor 1320. The terminal 250 may further include a UICC 1330. For example, the UICC 1330 may be inserted into the terminal 250 or may be an eUICC embedded in the terminal 250. The UICC 1330 may be included in at least one processor 1320 according to an embodiment, and the UICC 1330 may not be included in the terminal 250 according to another embodiment.

The transceiver 1310, according to various embodiments, may transmit and receive signals, information, and data according to various embodiments of the present disclosure to and from a profile provision server 1400 or a subscription relay server 1500.

For example, the transceiver 1310, according to various embodiments, may transmit a first message that requests an event to the subscription relay server 1500.

The transceiver 1310, according to various embodiments, may receive information related to the event from the subscription relay server 1500 in response to the first message.

The transceiver 1310, according to various embodiments, may transmit a second message that requests an event to the profile provision server 1400 on the basis of the information related to the event.

For example, the subscription relay server 1500, according to various embodiments, may include a first subscription relay server and a second subscription relay server.

The transceiver 1310, according to various embodiments, may transmit a third message that requests an event to the second subscription relay server on the basis of information related to the second event received from the first subscription relay server.

The transceiver 1310, according to various embodiments, may receive information on the first event from the second subscription relay server in response to the third message.

The transceiver 1310, according to various embodiments, may transmit the second message that requests the event to the profile provision server 1400 on the basis of the information related to the first event.

For example, the second message, according to various embodiments, may further include at least one piece of information related to the path through which the information related to the first event is acquired and information related to the second subscription relay server that replies with the information related to the first event.

The third message, according to various embodiments, may further include at least one piece of information related to the path through which the information related to the second event is acquired and information related to the first subscription relay server that replies with the information related to the second event.

The transceiver 1310, according to various embodiments, may receive information related to event processing from the profile provision server 1400 in response to the second message.

For example, the information related to the event processing received from the profile provision server 1400, according to various embodiments, may include information indicating event processing failure.

The information related to the event processing transmitted from the profile provision server 1400, according to various embodiments, may include information related to profile installation or remote management.

The processor 1320, according to various embodiments, may control the overall operation of the terminal 250. The processor 1320 may control the overall operation of the terminal 250 according to various embodiments of the present disclosure described above.

For example, at least one processor 1320, according to various embodiments, may identify the event processing exception list and determine whether to process the event on the basis of the information related to the event received from the subscription relay server 1500 and the event-processing exception list.

Further, at least one processor 1320, according to various embodiments, may transmit the second message that requests the event to the profile provision server 1400 on the basis of the determination of whether to process the event and the information related to the event by controlling the transceiver 1310, receive information on the event processing from the profile provision server 1400 in response to the second message, and update the event-processing exception list on the basis of the information related to the event processing. For example, when the information related to the event processing received from the profile provision server 1400 includes information indicating an event processing failure, at least one processor 1320, according to various embodiments, may add the information related to the event to the event-processing exception list.

The UICC 1330, according to various embodiments, may download a profile and install the profile. Further, the UICC 1330 may manage the profile.

The UICC 1330 may operate according to the control of the processor 1320. Alternatively, the UICC 1330 may include a processor or a controller for installing the profile, or an application may be installed therein. Part of the application may be installed in the processor 1320.

Meanwhile, the terminal 1300 may further include a memory (not shown), and may store data such as a basic program for the operation of the terminal 1300, an application, and setting information. Further, the memory may include at least one type of storage medium of a flash memory type, a hard-disk type, a multimedia card micro type, a card-type memory (for example, an SD memory, an XD memory or the like), a magnetic memory, a magnetic disk, an optical disk, a Random Access Memory (RAM), a Static RAM (SRAM), a Read-Only Memory (ROM), a Programmable Read-Only Memory (PROM), and an Electrically Erasable Programmable ROM (EEPROM). In addition, the processor 1320 may perform various operations using various types of programs, content, and data stored in the memory.

Figure 14:
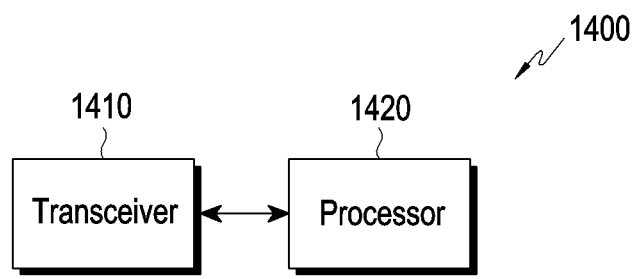
FIG. 14 is a block diagram illustrating elements of the profile provision server according to various embodiments.

Meanwhile, FIG. 14 illustrates elements of a profile provision server 1400 according to an embodiment of the present disclosure.

The profile provision server 1400, according to various embodiments, may include a transceiver 1410 and at least one processor 1420.

The transceiver 1410, according to various embodiments, may transmit and receive signals, information, and data according to various embodiments of the present disclosure to and from the terminal 1300 or a subscription relay server 1500. For example, the transceiver 1410 may transmit information related to profile installation or remote management to the terminal.

For example, the transceiver 1410, according to various embodiments, may receive an event request message from the terminal 1300.

For example, the event request message, according to various embodiments, may include event-related information, and the event-related information, according to various embodiments, may be based on information that the terminal 1300 receives from the subscription relay server 1500.

Meanwhile, at least one processor 1420 is an element for performing overall control of the profile provision server 1400. The processor 1420 may control the overall operation of the profile provision server 1400 according to various embodiments of the present disclosure.

For example, at least one processor 1420, according to various embodiments, may determine the validity of event-related information included in the event request message received from the terminal 1300 and control the transceiver 1420 to transmit information related to event processing to the terminal on the basis of the determination of the validity of the event-related information.

For example, when the event-related information is valid, the information related to the event processing, according to various embodiments, may include information related to profile installation or remote management.

When the event-related information is not valid, the information related to the event processing, according to various embodiments, may include information indicating event processing failure.

When the event processing is completed, at least one processor 1420, according to various embodiments, may control the transceiver 1410 to transmit an event deletion request message to the subscription relay server.

The event request message, according to various embodiments, may further include at least one piece of information related to the path through which the event-related information is acquired and information related to the subscription relay server 1500.

At least one processor 1420, according to various embodiments, may control the transceiver to transmit the event deletion request message to the subscription relay server 1500 on the basis of at least one piece of the information related to the path through which the event-related information is acquired and the information related to the subscription relay server 1500.

Meanwhile, the profile provision server 1400 may further include a memory (not shown), and may store a basic program for operation of the profile provision server 1400, applications, and data such as setting information. Further, the memory may include at least one type of storage medium of a flash memory type, a hard-disk type, a multimedia card micro type, a card-type memory (for example, an SD memory, an XD memory or the like), a magnetic memory, a magnetic disk, an optical disk, a Random Access Memory (RAM), a Static RAM (SRAM), a Read-Only Memory (ROM), a Programmable Read-Only Memory (PROM), and an Electrically Erasable Programmable ROM (EEPROM). In addition, the processor 1420 may perform various operations using various types of programs, content, and data stored in the memory.

Figure 15:
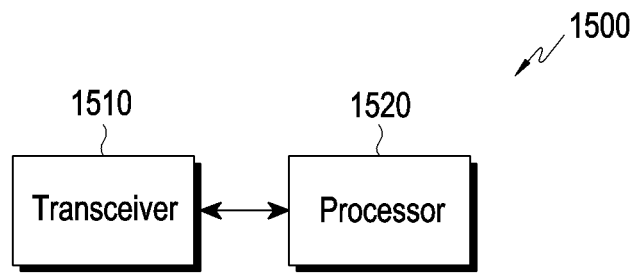
FIG. 15 is a block diagram illustrating elements of the subscription relay server according to various embodiments.

FIG. 15 illustrates elements of the subscription relay server 1500 according to an embodiment of the present disclosure.

The subscription relay server 1500, according to various embodiments, may include a transceiver 1510 and at least one processor 1520.

The transceiver 1510, according to various embodiments, may transmit and receive signals, information, and data according to various embodiments of the present disclosure to and from the terminal 1300 or the profile provision server 1400. For example, the transceiver 1510 may transmit event-related information to the terminal. For example, the transceiver 1510, according to various embodiments, may receive an event request message from the terminal.

For example, the event request message, according to various embodiments, may include event-related information, and the event-related information, according to various embodiments, may be on the basis of information that the terminal 1300 receives from another subscription relay server (not shown).

Meanwhile, at least one processor 1520 is an element for performing overall control of the subscription relay server 1500. The processor 1520 may control the overall operation of the subscription relay server 1500 according to various embodiments of the present disclosure described above.

For example, at least one processor 1520, according to various embodiments, may control the transceiver 1510 to receive an event registration request message from the profile provision server 1400 or another subscription relay server (not shown) in order to register the event.

At least one processor 1520, according to various embodiments, may register the event in response to the event registration request message.

The registered event, according to various embodiments, may pertain to the event generated by the profile provision server 1400.

For example, when the transceiver 1510 receives the event registration request message from the other subscription relay server, the registered event may be an event generated by modulating the event generated by the profile provision server.

At least one processor 1520, according to various embodiments, may control the transceiver 1510 to receive an event deletion request message from the profile provision server 1400 and delete the registered event on the basis of the event deletion request message.

The event registration request message, according to various embodiments, may include information related to an event expiration time point.

For example, at least one processor 1520, according to various embodiments, may delete the event on the basis of information related to the event expiration time point.

The event registration request message, according to various embodiments, may include information related to event deletion notification.

For example, at least one processor 1520, according to various embodiments, may control the transceiver 1510 to notify the profile provision server 1400 of the deletion of the event on the basis of the information related to the event deletion notification.

Meanwhile, the subscription relay server 1500 may further include a memory (not shown) and may store a basic program for operation of the subscription relay server 1500, applications, and data such as setting information. Further, the memory may include at least one type of storage medium of a flash memory type, a hard-disk type, a multimedia card micro type, a card-type memory (for example, an SD memory, an XD memory or the like), a magnetic memory, a magnetic disk, an optical disk, a Random Access Memory (RAM), a Static RAM (SRAM), a Read-Only Memory (ROM), a Programmable Read-Only Memory (PROM), and an Electrically Erasable Programmable ROM (EEPROM). In addition, the processor 1520 may perform various operations using various types of programs, content, and data stored in the memory.

Figure 16:
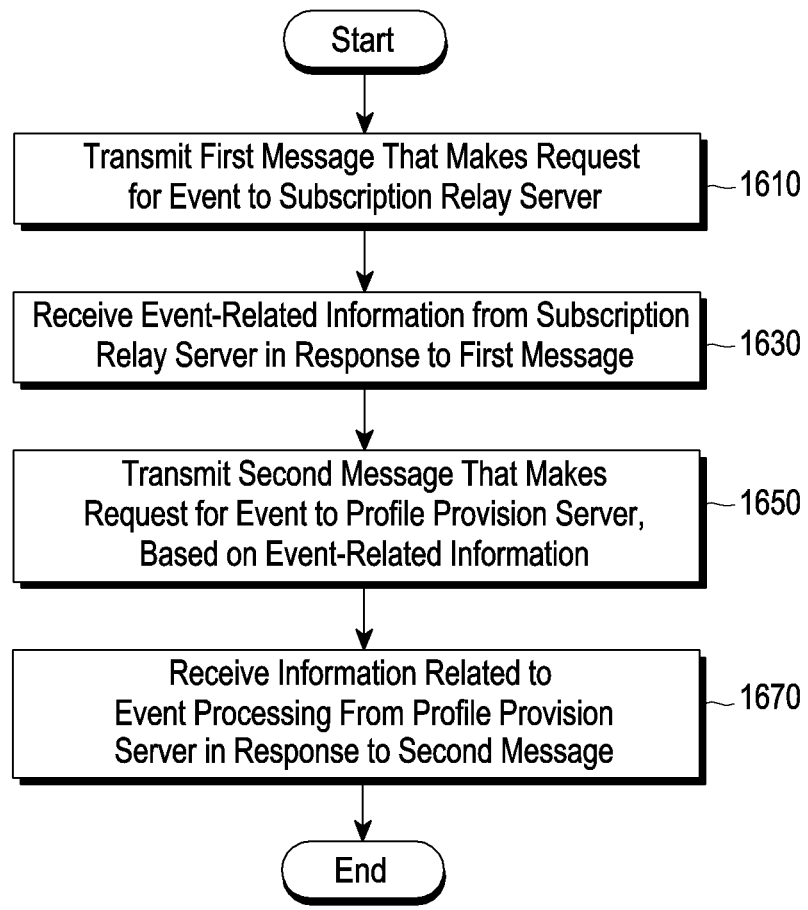
FIG. 16 illustrates a method by which the terminal manages an event according to various embodiments.

FIG. 16 illustrates a method by which the terminal manages an event according to various embodiments.

Referring to FIG. 16, the terminal may transmit a first message that requests an event to the subscription relay server in operation 1610.

The terminal may receive event-related information from the subscription relay server in response to the first message in operation 1630.

According to an embodiment, the subscription relay server may include a first subscription relay server and a second subscription relay server. The terminal may transmit a third message that makes a request for the event to the second subscription relay server on the basis of second event-related information received from the first subscription relay server and may receive first event-related information from the second subscription relay server in response to the third message. The terminal may transmit a second message that requests the event to the profile provision server on the basis of the first event-related information.

According to an embodiment, the second message may further include at least one piece of information related to a path through which the first event-related information is acquired and information related to the second subscription relay server which replies with the first event-related information, and the third message may further include at least one piece of information related to a path through which the second event-related information is acquired and information related to the first subscription relay server which replies with the second event-related information.

The terminal may transmit the second message that requests the event to the profile provision server on the basis of event-related information in operation 1650.

The terminal may receive information related to event processing from the profile provision server in response to the second message in operation 1670.

According to an embodiment, the information related to event processing received from the profile provision server may include information indicating event processing failure.

According to an embodiment, the information related to event processing transmitted from the profile provision server may include information related to profile installation or remote management.

The terminal may identify an event processing exception list, determine whether to process the event on the basis of event-related information received from the subscription relay server and the event processing exception list, transmit the second message that makes a request for the event to the profile provision server on the basis of the determination of whether to process the event and the event-related information, receive information related to event processing from the profile provision server in response to the second message, and update the event processing exception list on the basis of the information related to the event processing.

When the information related to the event processing received from the profile provision server includes the information indicating the event processing failure, the terminal may add the event-related information to the event processing exception list.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the embodiment has been described in the detailed description of the present disclosure, the present disclosure may be modified in various forms without departing from the scope of the present disclosure. Therefore, the scope of the present disclosure should not be defined as being limited to the embodiments, but should be defined by the appended claims and equivalents thereof.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B", "one or more of A and/or B", "A, B, or C", or "one or more of A, B and/or C" may include all possible combinations of them. The expression "a first", "a second", "the first" or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the other element or connected to the other element through yet another element (e.g., third element).

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments of the present disclosure may be implemented by software (e.g., program) including instructions stored in machine-readable storage media (e.g., internal memory or external memory). The machine is a device that can call the stored instructions from the storage media and operate according to the called instructions, and may include a terminal (e.g., terminal 1300 of FIG. 13) according to the various embodiments. The instructions, when executed by a processor (e.g., processor 1320 of FIG. 13, processor 1420 of FIG. 14, or processor 1520 of FIG. 15), may cause the processor to directly execute a function corresponding to the instructions or cause other elements to execute the function under the control of the processor. The instruction may include a code that is generated or executed by a compiler or interpreter.

The machine-readable storage media may be provided in the form of non-transitory storage media. Here, the term "non-transitory" only means that the storage media is tangible without including a signal, irrespective of whether data is semi-permanently or transitorily stored in the storage media.

The method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner At least some operations may be executed according to another sequence, may be omitted, or may further include other operations.

What is claimed is:

1. A method of managing an event by a subscription manager discovery service (SM-DS), the method comprising:
   receiving, from a subscription manager data preparation plus (SM-DP+), a first message for requesting a registration of an event, the first message including expiration time point for the event;
   identifying whether the expiration time point for the event has passed;
   deleting the event in case that the expiration time point for the event has passed; and
   transmitting, to the SM-DP+, a second message indicating that the event has been deleted.

2. The method of claim 1,
   receiving, from a terminal, a third message for requesting the event; and
   transmitting, to the terminal, a fourth message including an event ID in response to the third message.

3. The method of claim 1, wherein the first message further includes at least one of an event ID, an address of the SM-DP+, or an ID of an embedded universal integrated circuit card (eUICC).

4. The method of claim 1,
   operating a timer based on the expiration time point for the event; and
   identifying whether an event request is transmitted from a terminal after operating the timer.

5. The method of claim 4, wherein the event is deleted in case that the timer based on the expiration time point for the event is expired and the event request is not transmitted from the terminal.

6. A method of managing an event by a subscription manager data preparation plus (SM-DP+), the method comprising:
   transmitting, to a subscription manager discovery service (SM-DS), a first message for requesting a registration of an event, the first message including expiration time point for the event; and
   receiving, from the SM-DS, a second message indicating that the event has been deleted in case that the expiration time point for the event has passed and the event is deleted by the SM-DS.

7. The method of claim 6, wherein the first message further includes at least one of an event ID, an address of the SM-DP+, or an ID of an embedded universal integrated circuit card (eUICC).

8. The method of claim 6, wherein the event is deleted in case that a timer based on the expiration time point for the event is expired and an event request is not transmitted from a terminal to the SM-DS.

9. A subscription manager discovery service (SM-DS) for managing an event, the SM-DS comprising:
   a transceiver; and
   a processor coupled with the transceiver and configured to control to:
      receive, from a subscription manager data preparation plus (SM-DP+), a first message for requesting a registration of an event, the first message including expiration time point for the event,
      identify whether the expiration time point for the event has passed,
      delete the event in case that the expiration time point for the event has passed, and
      transmit, to the SM-DP+, a second message indicating that the event has been deleted.

10. The SM-DS of claim 9, wherein the processor is further configured to control to:

receive, from a terminal, a third message for requesting the event, and transmit, to the terminal, a fourth message including an event ID in response to the third message.

11. The SM-DS of claim 9, wherein the first message further includes at least one of an event ID, an address of the SM-DP+, or an ID of an embedded universal integrated circuit card (eUICC).

12. The SM-DS of claim 9, wherein the processor is further configured to control to:

operate a timer based on the expiration time point for the event, and identify whether an event request is transmitted from a terminal after operating the timer.

13. The SM-DS of claim 12, wherein the event is deleted in case that the timer based on the expiration time point for the event is expired and the event request is not transmitted from the terminal.

14. A subscription manager data preparation plus (SM-DP+) for managing an event, the SM-DP+ comprising:

a transceiver; and a processor coupled with the transceiver and configured to control to:

transmit, to a subscription manager discovery service (SM-DS), a first message for requesting a registration of an event, the first message including expiration time point for the event, and receive, from the SM-DS, a second message indicating that the event has been deleted in case that the expiration time point for the event has passed and the event is deleted by the SM-DS.

15. The SM-DP+ of claim 14, wherein the first message further includes at least one of an event ID, an address of the SM-DP+, or an ID of an embedded universal integrated circuit card (eUICC).

16. The SM-DP+ of claim 14, wherein the event is deleted in case that a timer based on the expiration time point for the event is expired and an event request is not transmitted from a terminal to the SM-DS.

* * * * *